US012193454B2

(12) United States Patent
Anand et al.

(10) Patent No.: US 12,193,454 B2
(45) Date of Patent: Jan. 14, 2025

(54) ICE CREAM MAKER ASSEMBLY

(71) Applicant: WHIRLPOOL CORPORATION, Benton Harbor, MI (US)

(72) Inventors: Prabhjee Anand, Pune (IN); Richard D. Arnold, St. Joseph, MI (US); Bryan Scott Burkhart, Berrien Springs, MI (US); Christopher J. Eaton, Stevensville, MI (US); Patrick David Feltman, Paw Paw, MI (US); Timothy E. Heater, Hartford, MI (US); Brandon Tyler Mock, St. Joseph, MI (US); Jon Patrick Morris, Anna, OH (US); Nicholas Hill Schutte, St. Joseph, MI (US); Rohit Ranjan Singh, Pune (IN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 710 days.

(21) Appl. No.: 17/343,012

(22) Filed: Jun. 9, 2021

(65) Prior Publication Data

US 2021/0392918 A1 Dec. 23, 2021

Related U.S. Application Data

(60) Provisional application No. 63/042,816, filed on Jun. 23, 2020.

(51) Int. Cl.
*A23G 9/12* (2006.01)
*A23G 9/22* (2006.01)
(Continued)

(52) U.S. Cl.
CPC .............. *A23G 9/12* (2013.01); *A23G 9/224* (2013.01); *A47J 43/044* (2013.01);
(Continued)

(58) Field of Classification Search
CPC ........... A23G 9/12; A23G 9/224; B01F 27/96; B01F 27/13; B01F 35/3204;
(Continued)

(56) References Cited

U.S. PATENT DOCUMENTS 3,780,536 A 12/1973 Fishman et al.
3,892,388 A * 7/1975 Wass ..................... B01F 27/192
366/330.1

(Continued)

FOREIGN PATENT DOCUMENTS

AU 2020100186 A4 3/2020
AU 2020100187 A4 3/2020
(Continued)

OTHER PUBLICATIONS

Guo et al., Food Mixer, Jul. 10, 2018. CN207590565U, Whole Document (Year: 2018).*
(Continued)

*Primary Examiner* — Larry L Furdge
(74) *Attorney, Agent, or Firm* — Price Heneveld LLP

(57) ABSTRACT

An ice cream making assembly includes a mixing bowl having an outer housing and an inner liner defining a wall cavity therebetween. The mixing bowl further includes a radiator fin unit received within a portion of the wall cavity and a phase-change medium filling a further portion of the wall cavity surrounding at least a portion of the radiator fin unit. The radiator fin unit defines an outer chamfer extending generally along an outer cross-sectional profile of the wall cavity and a tapered inner profile extending along inner cross-sectional profile of the wall cavity and in at least partial contact with the inner liner. The assembly further includes a dasher including first and second mixing arms extending outwardly from an anchor end of the axle and upwardly and outwardly to generally follow an angled inner (Continued)

profile of the a food-product receiving cavity defined by the liner.

18 Claims, 20 Drawing Sheets

(51) Int. Cl.
| | |
|---|---|
| *A47J 43/044* | (2006.01) |
| *A47J 43/07* | (2006.01) |
| *A47J 43/08* | (2006.01) |
| *B01F 27/13* | (2022.01) |
| *B01F 27/96* | (2022.01) |
| *B01F 35/32* | (2022.01) |
| *B01F 101/13* | (2022.01) |

(52) U.S. Cl.
CPC ....... *A47J 43/0711* (2013.01); *A47J 43/0727* (2013.01); *A47J 43/082* (2013.01); *B01F 27/13* (2022.01); *B01F 27/96* (2022.01); *B01F 35/3204* (2022.01); *A47J 2043/04481* (2013.01); *B01F 2101/13* (2022.01)

(58) Field of Classification Search
CPC .. B01F 2101/13; A47J 43/044; A47J 43/0711; A47J 43/0727; A47J 43/042; A47J 2043/04481
See application file for complete search history.

(56) References Cited

U.S. PATENT DOCUMENTS

| | | | |
|---|---|---|---|
| 4,326,389 A | 4/1982 | Frost | |
| 4,674,886 A | 6/1987 | Uesaka et al. | |
| 4,696,166 A | 9/1987 | Bukoschek et al. | |
| 4,885,917 A | 12/1989 | Spector | |
| 5,106,199 A | 4/1992 | Eckel et al. | |
| 5,423,996 A * | 6/1995 | Salyer | A61L 15/18 |
| | | | 165/104.12 |
| 6,205,806 B1 | 3/2001 | Huang | |
| 6,622,511 B2 | 9/2003 | Ashworth et al. | |
| 9,497,987 B2 | 11/2016 | Jossem | |
| 2014/0050045 A1 | 2/2014 | Hoare et al. | |
| 2015/0059651 A1 * | 3/2015 | Talt | A01K 5/0121 |
| | | | 119/61.5 |
| 2017/0042179 A1 | 2/2017 | Thomas | |
| 2017/0225879 A1 | 8/2017 | Stein et al. | |
| 2020/0009520 A1 | 1/2020 | Kellenberger et al. | |
| 2020/0245638 A1 | 8/2020 | Crema et al. | |
| 2020/0245639 A1 | 8/2020 | Crema et al. | |

FOREIGN PATENT DOCUMENTS

| | | | |
|---|---|---|---|
| CH | 660833 A5 | | 5/1987 |
| CN | 1073816 A | | 6/1993 |
| CN | 207590565 U | * | 7/2018 |
| CN | 209915597 U | * | 1/2020 |
| DE | 3736469 A1 | | 5/1989 |
| DE | 29713906 U1 | | 10/1997 |
| EP | 1334664 B1 | | 8/2003 |
| EP | 3369353 A1 | * | 9/2018 |
| FR | 2899767 A1 | | 10/2007 |
| GB | 2144208 A | | 2/1985 |
| IT | UD20090070 A1 | | 10/2010 |
| KR | 102082220 B1 | * | 5/2020 |
| WO | 03055326 A1 | | 7/2003 |

OTHER PUBLICATIONS

Ahn, Vertical Mixer with Chocolet Bath Apparatus, May 4, 2020, KR102082220B1, Whole Document (Year: 2020).*

Li, Noodle Mixing PP Bowl, Jan. 10, 2020, CN209915597U, Whole Document (Year: 2020).*

* cited by examiner

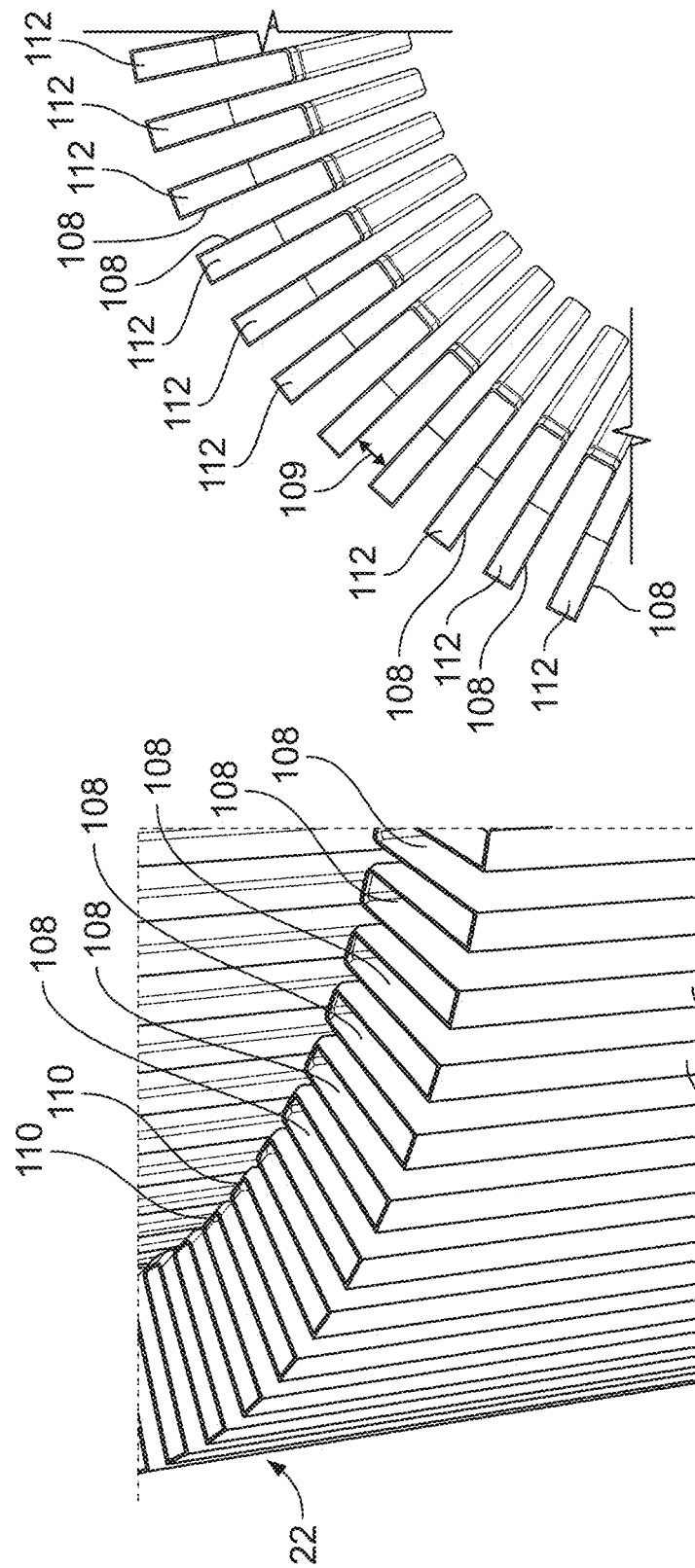

ICE CREAM MAKER ASSEMBLY

CROSS REFERENCE TO RELATED APPLICATION

This application claims the benefit under 35 U.S.C. § 119(e) to U.S. Provisional Patent Application No. 63/042,816, filed Jun. 23, 2020, entitled "ICE CREAM MAKER ASSEMBLY," which is incorporated herein by reference in its entirety.

BACKGROUND OF THE DISCLOSURE

The present disclosure generally relates to an ice cream making attachment assembly for a stand mixer, and more specifically, to improvements to various components of the assembly to improve the usability and results of the assembly.

SUMMARY OF THE DISCLOSURE

According to one aspect of the present disclosure, an ice cream making assembly includes a mixing bowl, having an outer housing and an inner liner defining a wall cavity therebetween. The inner liner further defines a food-product receiving cavity therein. The mixing bowl further includes a radiator fin unit received within a portion of the wall cavity and a phase-change medium filling a further portion of the wall cavity surrounding at least a portion of the radiator fin unit. The outer housing defines an arc-shaped outer cross-sectional profile of the wall cavity, and the inner liner defines an angled inner cross-sectional profile of the wall cavity. The radiator fin unit defines an outer chamfer extending generally along the outer cross-sectional profile and a tapered inner profile extending along the inner cross-sectional profile of the wall cavity and in at least partial contact with the inner liner. The assembly further includes a dasher having a center axle extending along an axis from an input end of the center axle to an anchor end contacting a central portion of the inner liner, the dasher further including first and second mixing arms including support portions extending outwardly from the anchor end of the axle and side portions extending upwardly and outwardly from the support portions to generally follow an angled inner profile of the food-product receiving cavity.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 15 is a top detail view of the radiator fin unit;

FIG. 16 is a perspective detail view of the radiator fin unit;

Figure 1:
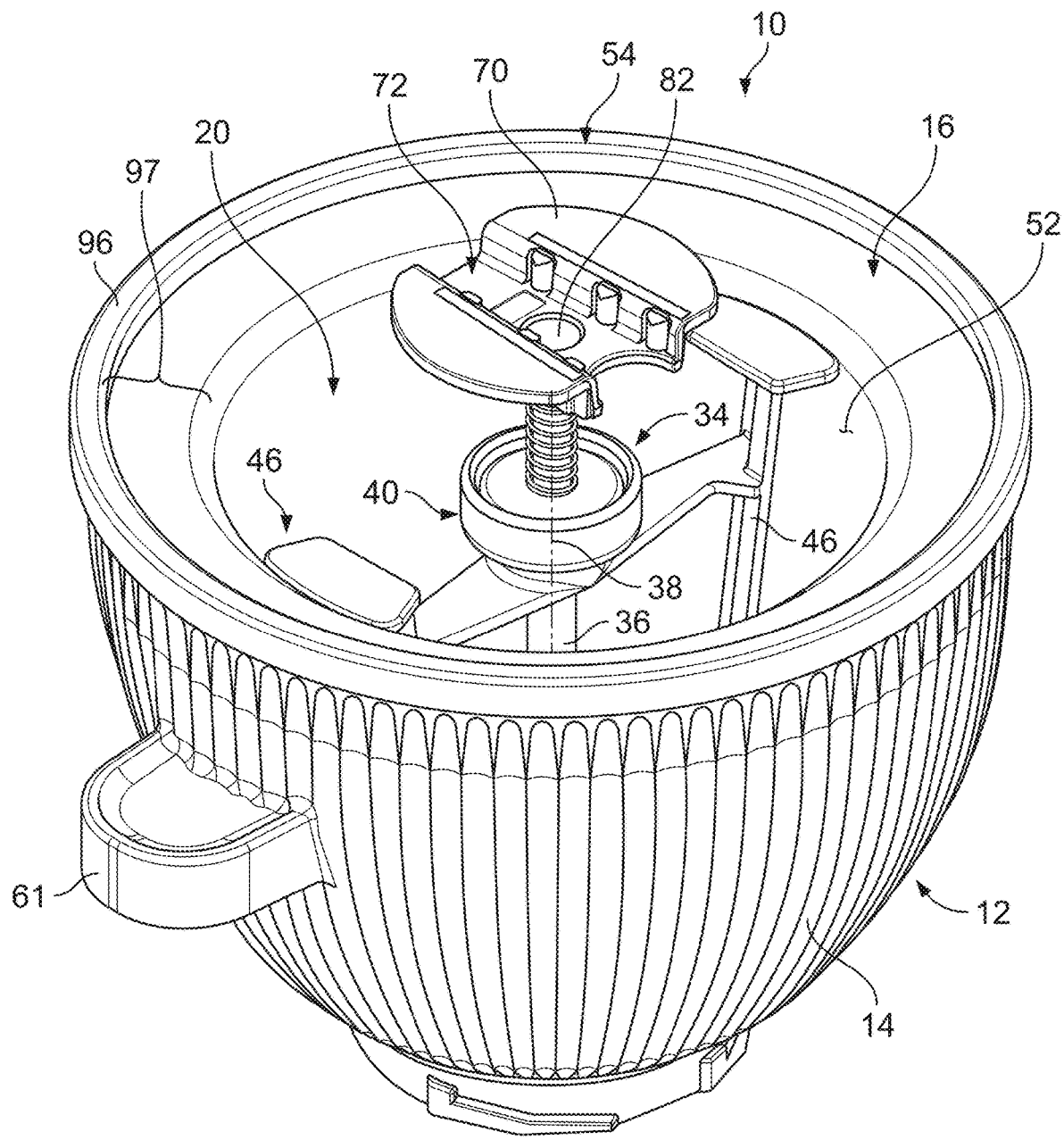
FIG. 1 is a perspective view of an ice cream making assembly.

The components in the figures are not necessarily to scale, emphasis instead being placed upon illustrating the principles described herein.

DETAILED DESCRIPTION

The present illustrated embodiments reside primarily in combinations apparatus components related to an ice cream maker assembly. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, article, or apparatus that comprises a list of elements does not include only those elements but may include other elements not expressly listed or inherent to such process, article, or apparatus. An element proceeded by "comprises a . . . " does not, without more constraints, preclude the existence of additional identical elements in the process, article, or apparatus that comprises the element.

Referring to FIGS. 1-17, reference numeral 10 generally designates an ice cream making assembly. The ice cream making assembly 10 includes a mixing bowl 12 having an outer housing 14 with an arc-shaped outer cross-sectional profile 26 extending from an upper rim 96 toward a base 63 of the mixing bowl 12. The mixing bowl 12 further includes an inner liner 16 disposed within the outer housing 14 to define a wall cavity 18 therebetween. The inner liner 16 defines a food-product receiving cavity 20 having an upper edge 51 spaced beneath and inset with respect to the rim 96 and a sidewall 52 extending downwardly and inwardly from the upper edge 51. The inner liner 16 further defines an overflow area 97 positioned above the food-product receiving cavity 20 and extending outwardly from the upper edge 51 toward the rim 96. The assembly 10 further includes a dasher 34 having a center axle 36 extending along an axis 38 from an input end 40 of the center axle 36 to an anchor end 42 contacting a central portion 44 of the inner liner 16 within the food-product receiving cavity 20. The dasher 34 also has first and second mixing arms 46a,46b having side portions 50a,50b spaced outwardly from the center axle 36 to engage with the sidewall 52 of the food-product receiving cavity 20.

As shown in FIG. 1, the assembly 10 further includes a drive assembly 54 configured for transferring a torque applied generally along the axis 38 to the dasher 34 to cause rotation thereof about the axis 38. As discussed further below the mixing bowl 12 further includes a radiator fin unit 22 (FIGS. 7 and 13-15) received within a portion of the wall cavity 18 and a phase-change medium 24 filling a further portion of the wall cavity 18 surrounding at least a portion of the radiator fin unit 22. In this manner, the mixing bowl 12 is configured, as discussed further below, to be cooled (such as within a freezer) to cause the phase-change medium 24, which is a liquid at room temperature, to freeze into a solid. A food-product in the general form of a liquid may be introduced to the food-product receiving cavity 20 such that the heat of the liquid food product is transferred by contact to the inner liner 16, which may be of metal (e.g., aluminum or the like) or another heat-conducting material, and into the phase-change medium 24. In one non-limiting example, the phase change medium can comprise urea and, in a further example, a solution including between about 25% and 50% or, more specifically between about 30% and 40% or about 32.5%. This process causes cooling of the food product to result in rapid freezing of the food product to form fine crystals at the contact interface between the inner liner 16 and the food product. Accordingly, the dasher 34 is configured to rotate with respect to the mixing bowl 12 to scrape the crystals from off of the inner liner 16 and to "churn" the food product to disperse the crystals within the entirety of the food product, to bring unfrozen portions of the food product into contact with the inner liner 16, and to aerate the food product. As is generally known, this general process is useable with certain types of food products to generate distributed fine crystals of frozen liquid (e.g., water) and fine air bubbles that are densely packed, yet separated within other solid components of the food product mixture (e.g., lipids and other food solids).

As can be appreciated, this is the general composition of ice cream, whereby the food product to which the above process is applied is sweetened or otherwise flavored cream or custard (with the food product further including other additives such as liquid or solid confections or fruit, for example). As is also further appreciated, the above process can be applied to other primarily-liquid food product mixtures to create other frozen desserts or the like, including but not limited to gelato, sorbet, sherbet, frozen yogurt, etc. In general, the above process is run until sufficient formation of ice crystals and aeration has been achieved. While acceptable end products can be achieved without fully solidifying the product (with such solidification being achieved through further subsequent chilling in, for example, a freezer), the end product can be improved by distributing relatively more ice crystals within the product during churning. The ability of a so-called ice cream maker to achieve this relatively higher distribution (and increased solidification) can be improved by increases in the efficiency with which the ice cream maker transfers heat away from the inner liner 16 during thawing of the phase-change medium 24 (as this is the phase when the medium absorbs heat more rapidly) and by maximizing scraping and agitation (or churning) of the food product to create an increased quantity of crystals at a minimum size with even distribution and minimal cohesion during the course of the phase-change medium 24 thawing.

Figure 2:
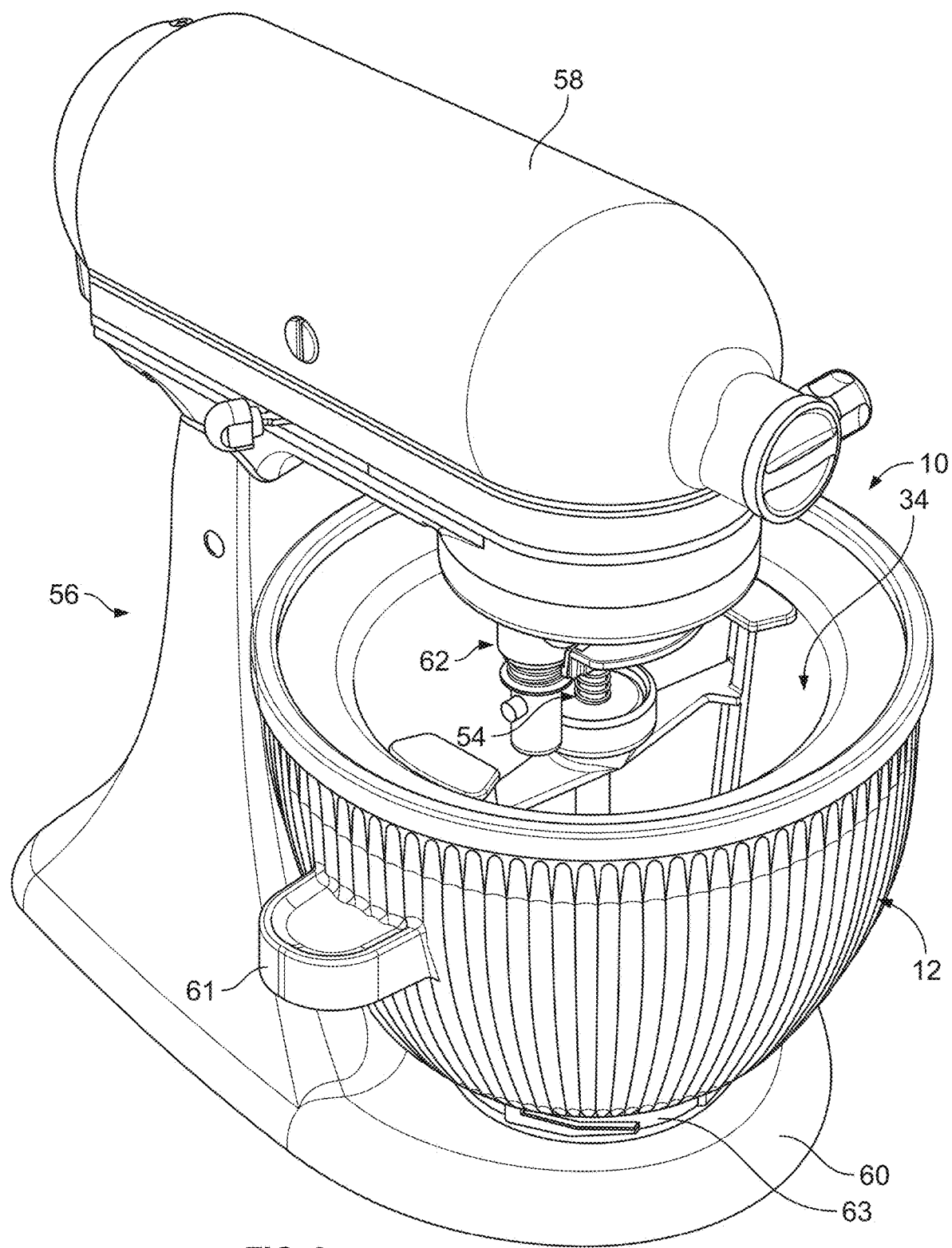
FIG. 2 is a perspective view of the assembly in position within a stand mixer.
Figure 3:
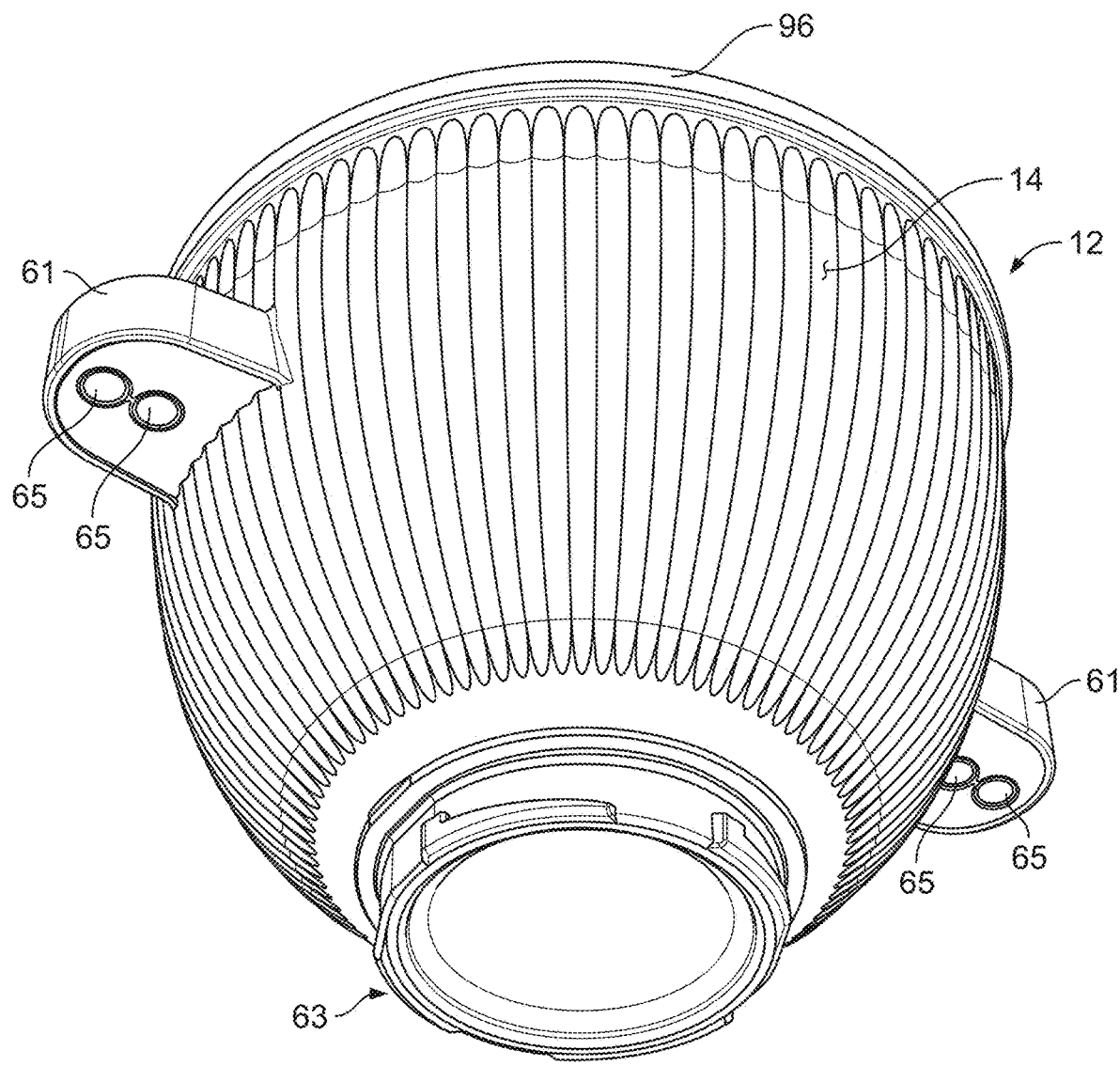
FIG. 3 is a bottom perspective view of a mixing bowl of the assembly.
Figure 4:
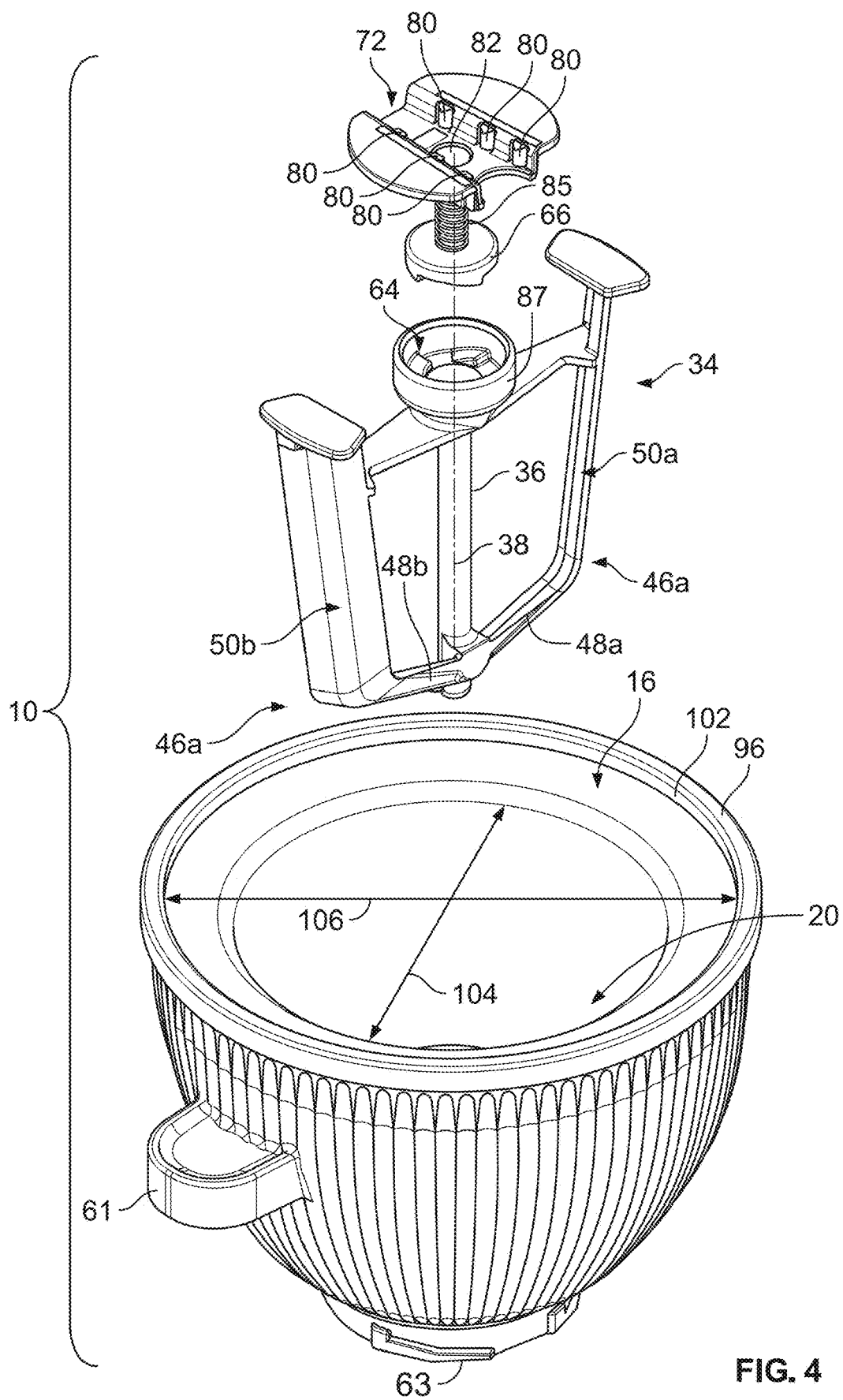
FIG. 4 is an exploded view of the assembly.

The various aspects of the ice cream making assembly 10 disclosed herein can function alone or in various combinations to provide such improvements. In this respect, various specific aspects of the assembly 10 discussed herein can be applied to other forms, types, or configurations of ice cream makers to achieve similar improvements. In this manner, the present ice cream making assembly 10 is shown as an accessory/attachment for a stand mixer 56, as shown in FIG. 2. Although such mixers 56 can take a variety of forms, they generally include a drive head 58 (which may house a motor) and a stand 60. As shown in FIG. 2, the mixing bowl 12 is configured to be coupled with and generally supported by the stand 60. In the example stand mixer 56 shown, this coupling is received through the base 63 of the mixing bowl 12, which is fitted with a bayonet-fit structure and/or thread components. The present mixing bowl 12 is also configured to be supported by a bowl-lift mechanism included with other examples of stand mixers by the positioning and configuration of the depicted handles 61, which are positioned to appropriately align with arms of such a lifting mechanism. Further, the handles 61 include at least one boss 65 (FIG. 3) therein to receive pins positioned on the arms of the lifting mechanism (with the present example including two bosses 65 at different spacings to receive pins of lifting mechanisms of varying configurations). As further shown in FIG. 2, and described further below, the dasher 34 is connected, by way of drive assembly 54 with the drive head 58 of the stand mixer 56 such that the stand mixer 56 can drive rotation of the dasher 34 within the mixing bowl 12, as discussed above. In this manner, certain aspects of the drive assembly 54, discussed below, are generally adapted to allow use of the ice cream making assembly 10 of the present disclosure to be used in connection with the stand mixer 56. However, as would be understood, other aspects of the assembly 10 discussed herein can be adapted for use in a stand-alone appliance, including by various adaptations for driving rotation of the dasher 34 and/or in other variations where a bowl is rotated about a stationary dasher.

Figure 5:
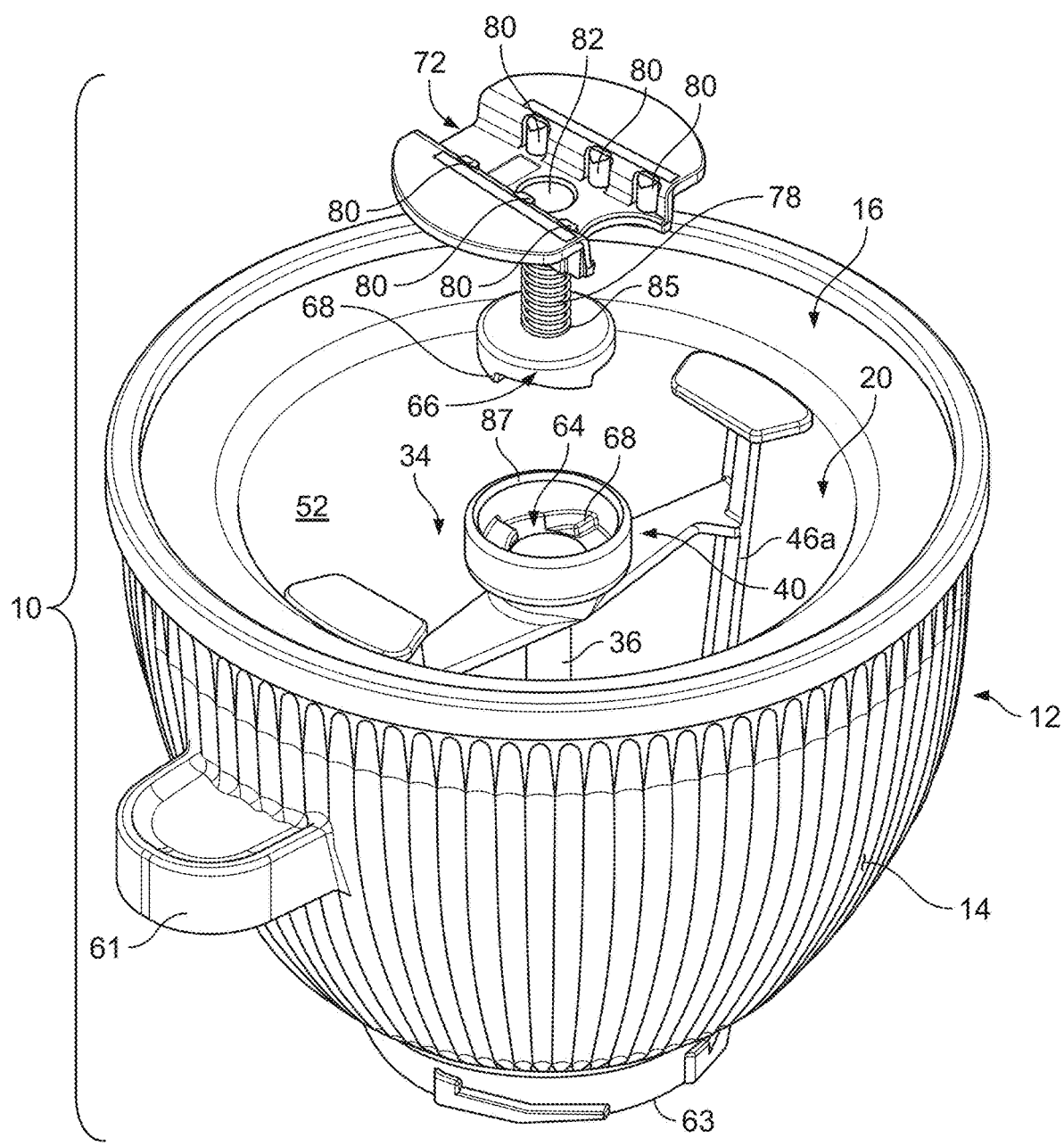
FIG. 5 is a view of the assembly during a sequence of arranging the components of the assembly for use.
Figure 6:
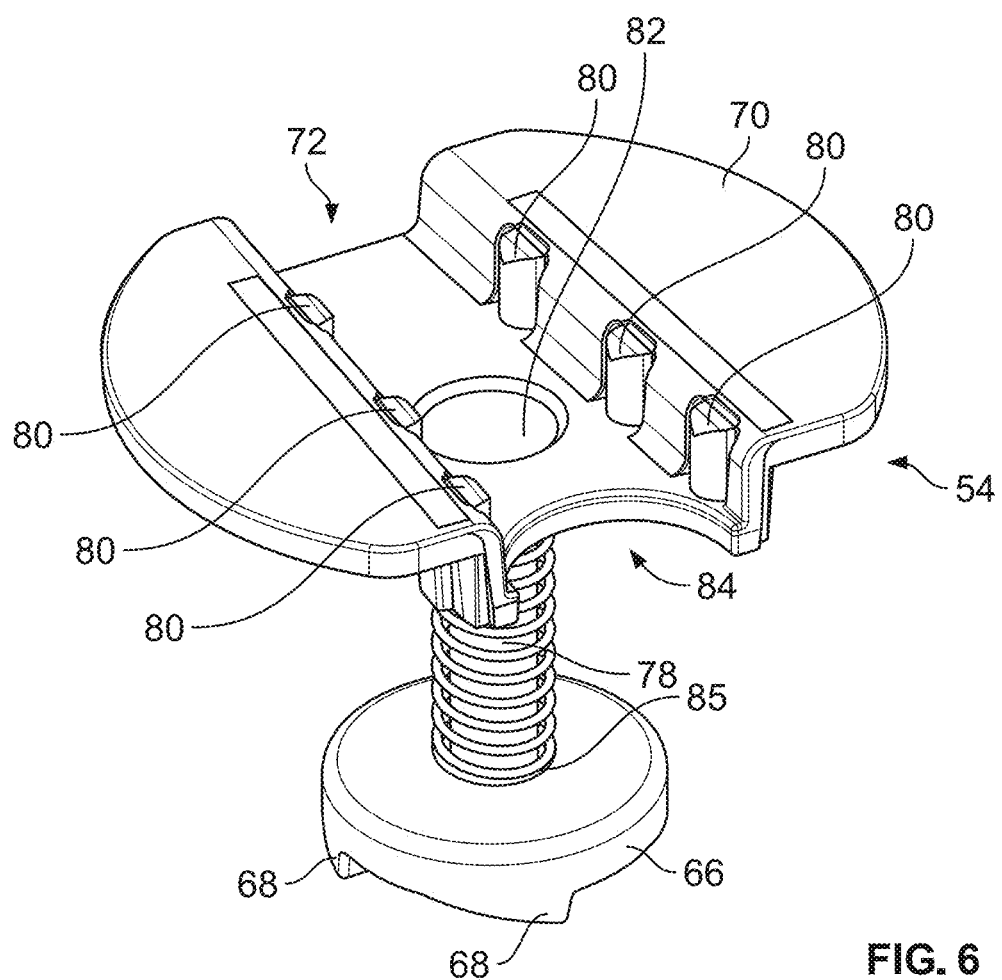
FIG. 6 is a perspective view of a drive assembly.
Figure 7:
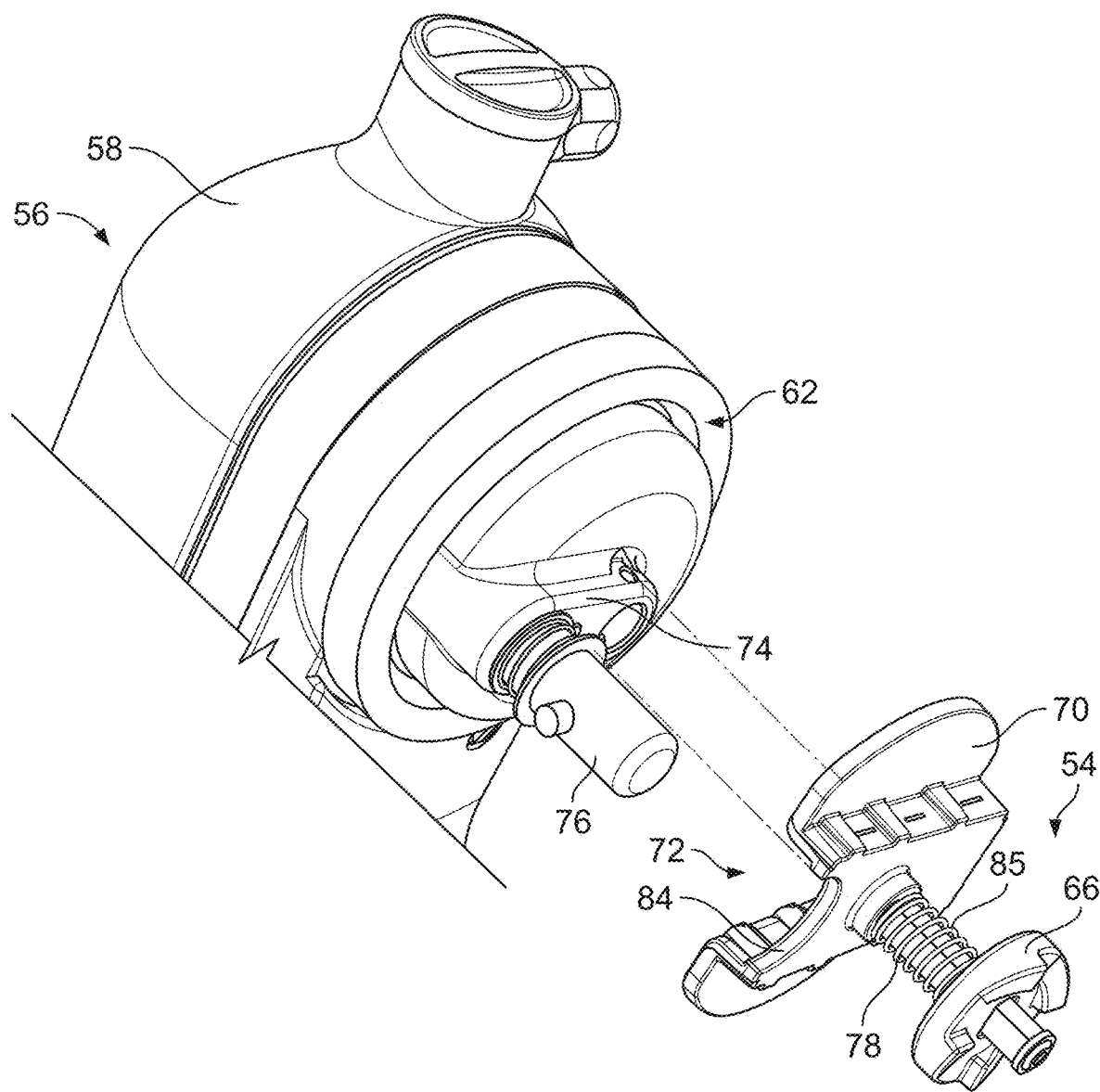
FIG. 7 is a perspective view showing coupling of the drive assembly with a drive head of the stand mixer.
Figure 8:
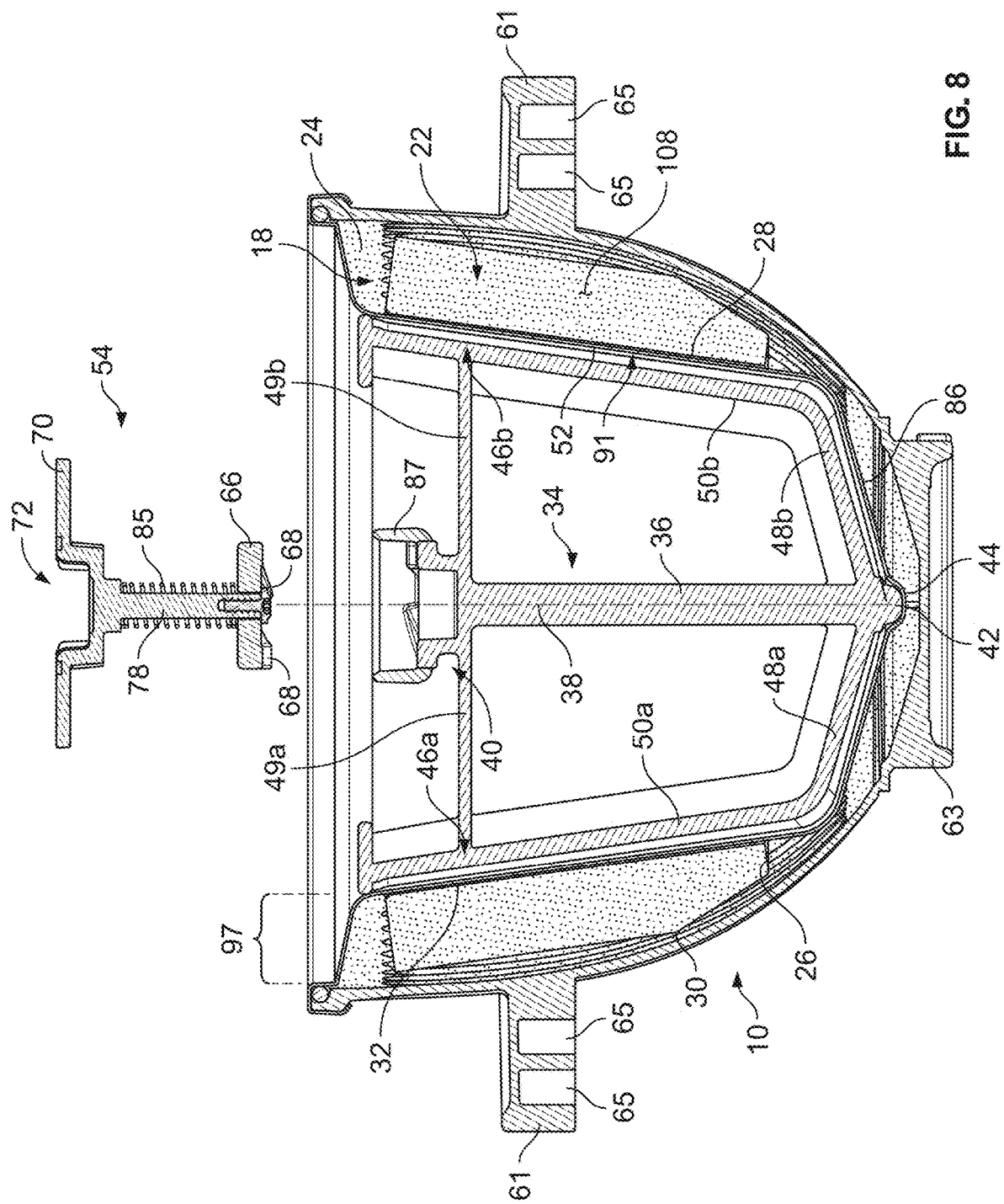
FIG. 8 is a cross-sectional view of the arrangement of FIG. 5.

With reference to FIGS. 4-10, the coupling of the drive assembly 54 with the dasher 34 and, oppositely, with a hub 62 of the drive head 58 of the example stand mixer 56 are illustrated. In one example, the drive assembly 54 may be attached to the dasher 34 after the dasher 34 has been received within the food-product receiving cavity 20 (FIG. 5), as discussed further below, although variations in the assembly process are contemplated. In one example, the drive assembly 54, as shown in FIG. 6, includes an input plate 70 that defines a channel 72 therein that is configured to engage with a gear housing 74 present on an output hub 62 of the stand mixer 56. In general, such mixers 56, as shown in the example of FIG. 7 often include a planetary output shaft 76 that rotates on its axis while the hub 62 itself rotates in an opposite direction about an axis that is disposed along the center of the drive head 58. In this manner, the output shaft axis is offset from the drive head 58 axis such that attachment of the dasher 34 to the output shaft 76 is not desired. Rather, the dasher 34 is configured to be driven about the centered axis of the hub 62 with the axis 38 of axle 36 generally aligned therewith. Because the eccentric, planetary rotation of the output shaft 76 is driven by a gear assembly fitted within the hub 62, such features will generally define the above-mentioned gear housing 74 that extends from the center of the hub 62 outwardly toward the output shaft 76. In the example shown, the gear housing 74 is integrally formed within the hub 62 as a feature generally defining an elongate shoulder with flat faces. In this manner, the channel 72 in the input plate 70 of the drive assembly 54 can be configured to couple with the gear housing 74 in a press fit engagement that disregards the output shaft 76 of the mixer 56 and couples a central drive shaft 78 of the drive assembly 54 with the hub 62 for rotation about the fixed axis thereof.

As shown in FIGS. 6 and 7, the channel 72 in the input plate 70 can include a plurality of flexible and/or compressible thermoplastic elastomer ("TPE") inserts 80 extending inwardly thereinto and spaced along a length thereof. The inserts can be configured (in size and compressibility) to allow the input plate 70 to fit in a press-fit engagement with a range of differently-sized or otherwise configured gear housings 74 by absorbing size difference between such housings 74, which may vary in size and configuration across a range of stand mixers 56. In one example, the input plate 70 can be of a thermoplastic material, such as Polyamide A plastic (also referred to as Nylon plastic or "PA plastic") with the TPE inserts 80 overmolded to the PA plastic. The input plate 70 can include an alignment feature 82 on an interior of the channel 72 that can help a user to visually or physically assess the alignment of the drive shaft 78 with the center of the hub 62. In one aspect, the channel 72 can be tapered to match a general taper of the range of gear housings 74 with which it is intended to fit. The input plate 70 can also include a notch 84 within the channel 72 to allow for clearance of the mixer 56 output shaft 76 and/or to facilitate alignment. As shown in FIG. 7, in one implementation, the channel 72 can be aligned with the gear housing 74 and the input plate 70 can be pressed into assembly with the hub 62. To facilitate such attachment, the drive head 58 can be tilted (if the mixer 56 facilitates tipping) or the drive assembly 54 can be assembled with the hub 62 prior to assembly of the mixing bowl 12 or with the mixing bowl 12 in a lowered position. In an alternative arrangement, the channel 72 can be somewhat widened such that a press-fit arrangement is not achieved, but rather a generally looser fit between the channel 72 and the gear housing 74 such that the drive assembly 54 can be coupled with the dasher 34 (when in place within the food-product receiving cavity 20) prior to lowering of the drive head 58 or raising of the mixing bowl 12 to move the gear housing 74 into the channel 72 for operable engagement therebetween.

Figure 9:
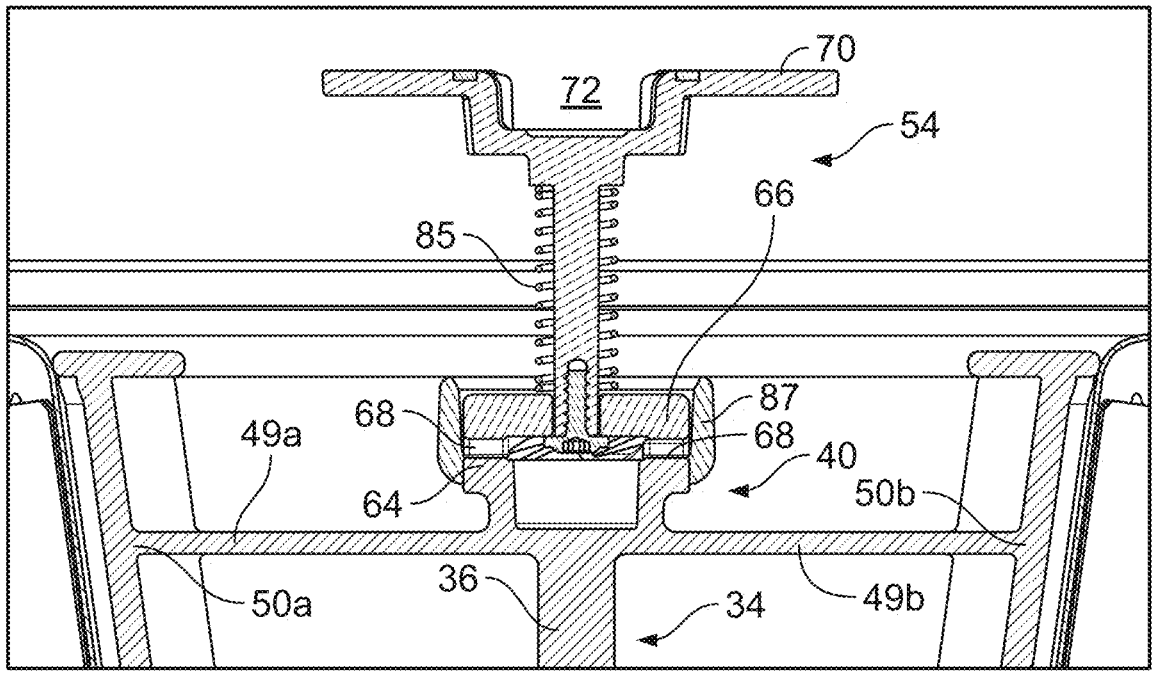
FIG. 9 is a cross-sectional view of components during a further assembly step.

To facilitate assembly, the dasher 34, as shown in FIG. 5, includes a first clutch plate 64 at the input end 40 of the center axle 36. As shown in FIGS. 5 and 6, the drive assembly 54 includes a second clutch plate 66 operably engageable with the first clutch plate 64 and mounted on an end of the drive shaft 78 opposite the input plate 70 such that the drive assembly 54 can cause rotation of the dasher 34 within the food-product receiving cavity 20. In particular, the first and second clutch plates 64 and 66 are configured as clutch gears with respective sets of interengaging teeth 68. As can be appreciated, the teeth 68 are generally of a similar configuration and arrangement (including the angles and phases thereof) between the first clutch plate 64 and the second clutch plate 66 such that the teeth 68 are oppositely arranged when the first and second clutch plates 64 and 66 are aligned for engagement. The teeth 68 include leading faces at a relatively high attack angle to facilitate driving of the dasher 34 with rotation of the drive assembly 54 and trailing faces at relatively low angles to allow mutual sliding for rotation of the drive assembly 54 relative to the dasher 34. The second clutch plate 66 is movable along the drive shaft 78 and is biased away from the input plate 70 by a spring 85. As shown in FIG. 9, this allows the second clutch plate 66 to contact the first clutch plate 64 in initial assembly of the drive assembly 54 to the dasher 34 (regardless of the particular assembly sequence).

Figure 10:
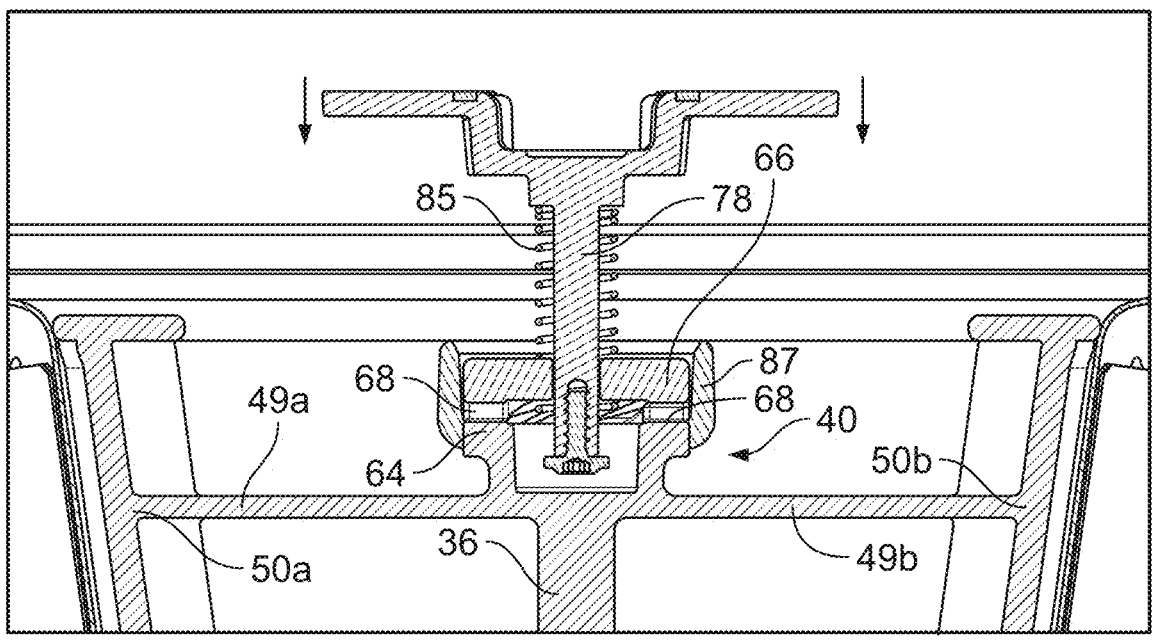
FIG. 10 is a cross-sectional view of components during a still further assembly step.

Continued movement of the drive assembly 54 into engagement with the dasher 34, such as by lowering of the drive head 58 or raising of the mixing bowl 12 can cause relative movement of the second clutch plate 66 toward the input plate 70 under compression of the spring 85 (FIG. 10). This movement can allow for the second clutch plate 66 to engage with the first clutch plate 64 within a range of positions for the mixer hub 62 relative to the bowl 12 position, which may vary among mixers 56. This arrangement can also allow for initial misalignment between the clutch plates 64 and 66 with the second clutch plate 66 being pushed toward the input plate 70 in such initial position by the engagement of the teeth 68 along the trailing surfaces thereof. In such an arrangement, initial rotation of the hub 62 can allow for proper engagement of the teeth 68 with the spring 85 biasing the second clutch plate 66 into full engagement with the first clutch plate 64. Additionally, the compression of the spring 85 allows movement of the second clutch plate 66 in the vertical direction against the bias to selectively release from the first clutch plate 64 upon a torque between the drive shaft 78 and the center axle 36 sufficient to cause movement of the leading faces of the teeth 68 against each other and against the force of the spring 85. This can prevent damage to either the drive assembly 54 or the dasher 34 due to jamming or other overtorque scenarios.

As further shown in FIGS. 8-11, the dasher 34 can further define a circular flange 87 surrounding the first clutch plate 64 and extending upwardly therefrom opposite the anchor end 42 of the center axle 36. The second clutch plate 66 is operably receivable within the circular flange 87, including prior to compression of the spring 85 (as shown in FIG. 9). This arrangement can allow for feedback on mating of the clutch plates 64 and 66 during the above-described assembly process and can increase stability during such assembly. In a further aspect, the fitting of the second clutch plate 66 within the circular flange 87 can facilitate assembly of the drive assembly 54 with the dasher 34 prior to assembly of the drive assembly 54 with the hub 62, as discussed above.

Figure 11:
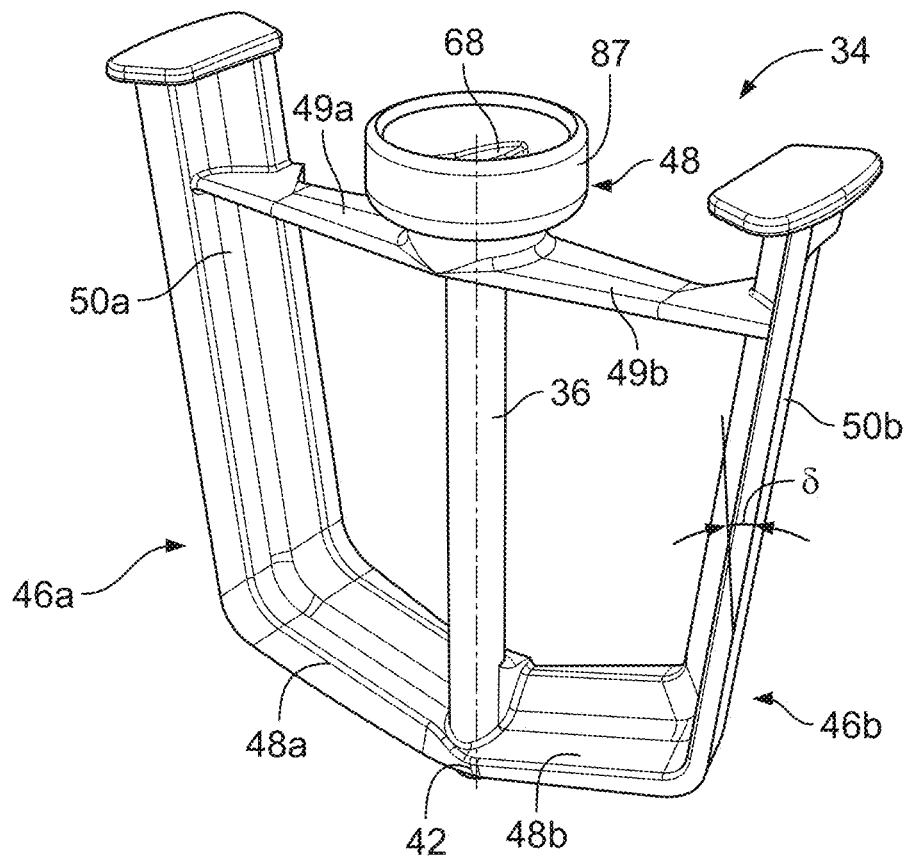
FIG. 11 is a perspective view of a dasher of the assembly.
Figure 12A:
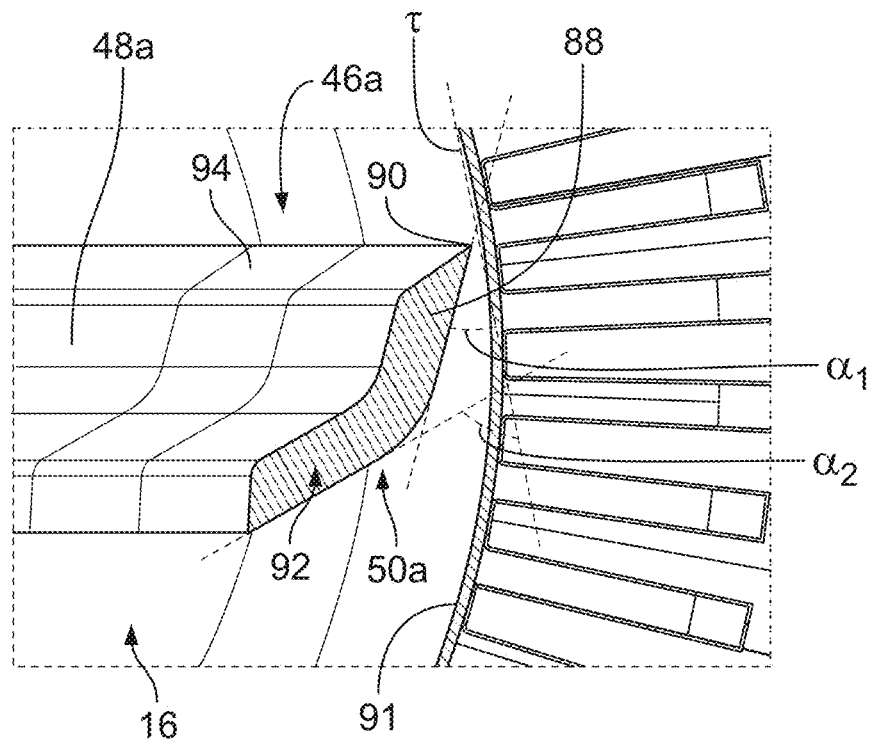
FIGS. 12A-12B are cross-sectional views of the dasher in place within the mixing bowl.

Turning now to FIGS. 11 and 12A, various aspects of the dasher 34 configuration can improve usability of the disclosed ice cream making assembly 10 and can further improve performance thereof. In one aspect, the first and second mixing arms 46a, 46b are supported with respect to the center axle 36 by direct connection therewith. As illustrated in FIG. 11, the mixing arms 46a and 46b define support portions 48a and 48b that extend oppositely and laterally away from the center axle 36 (at a slight upward angle of, for example between about 5° and 10°, to match the lower surface 86 of the inner liner 16 from near the anchor end 42. The above-mentioned side portions 50a and 50b of the mixing arms 46a and 46b are defined by portions of the mixing arms 46a and 46b that extend upwardly away from the support portions 48a and 48b to generally follow the profile of the tapered inner surface 91 of the food-product receiving cavity 20. Upper support arms 49a and 49b can separately extend from adjacent the input end 40 of the center axle 36 to respectively attach with the side portions 50a and 50b laterally adjacent the input end 40 to provide additional support and stability for mixing arms 46a and 46b. This arrangement can facilitate relatively easy removal of the dasher 34 from a frozen food-product created within the food-product receiving cavity 20 using the dasher 34. The first and second mixing arms 46a and 46b can be configured to generally follow the interior profile of the inner liner 16, which as shown in FIG. 7 can include the above-mentioned tapered inner surface 91, along with a concave/conical lower surface 86. This shape of the inner liner 16 can allow for easier access to the food-product receiving cavity 20 by the user and can generally follow the arc-shaped outer of the outer housing 14. The dasher 34 can be of a thermoplastic such as Polyoxymethylene (also referred to as Acetal Plastic or "POM") to provide desired rigidity and temperature resistance.

As further shown in FIGS. 11 and 12A, the first mixing arm 46a defines, in a cross-sectional profile thereof, a scraping portion 88 having a leading face 94 with an edge 90 positionable in contact with the inner surface 91 of the food-product receiving cavity 20, as defined by the inner liner 16. The scraping portion 88 extends at an acute angle $\alpha_1$ (e.g. of about 20°) with respect to a tangent $\tau$ of the contact point of the edge 90 along the inner surface 91. The leading face 94 is positioned at about 45° with respect to the tangent $\tau$. In this arrangement, the mixing arm 46a is configured such that the leading edge 90 is positioned forward of the scraping portion 88 under rotation of the dasher 34 in direction R, as implemented by the direction in which the mixer hub 62 rotates. Such rotation brings the leading edge 90 into contact with ice crystals, with the acute angle defined between the scraping portion 88 and the leading face 94 promoting scraping of such ice crystals from off of the inner surface 91 of inner liner 16. The leading face 94 also serves to direct inward the scraped crystals, along with the surrounding medium. The cross-sectional profile further has an agitation rib 92 extending from the scraping portion 88 away from the inner surface 91 at an obtuse angle $\alpha_2$ (e.g. of about 70°) with respect to the tangent $\tau$. The illustrated cross-sectional profile can be generally consistent between the support portion 40a and the side portion 50a. An alternative dasher that is, effectively, a mirror image of the depicted dasher 34 can be used with a stand mixer 56, for example, with the hub 62 that rotates in a direction opposite the depicted direction of rotation R.

Figure 12B:
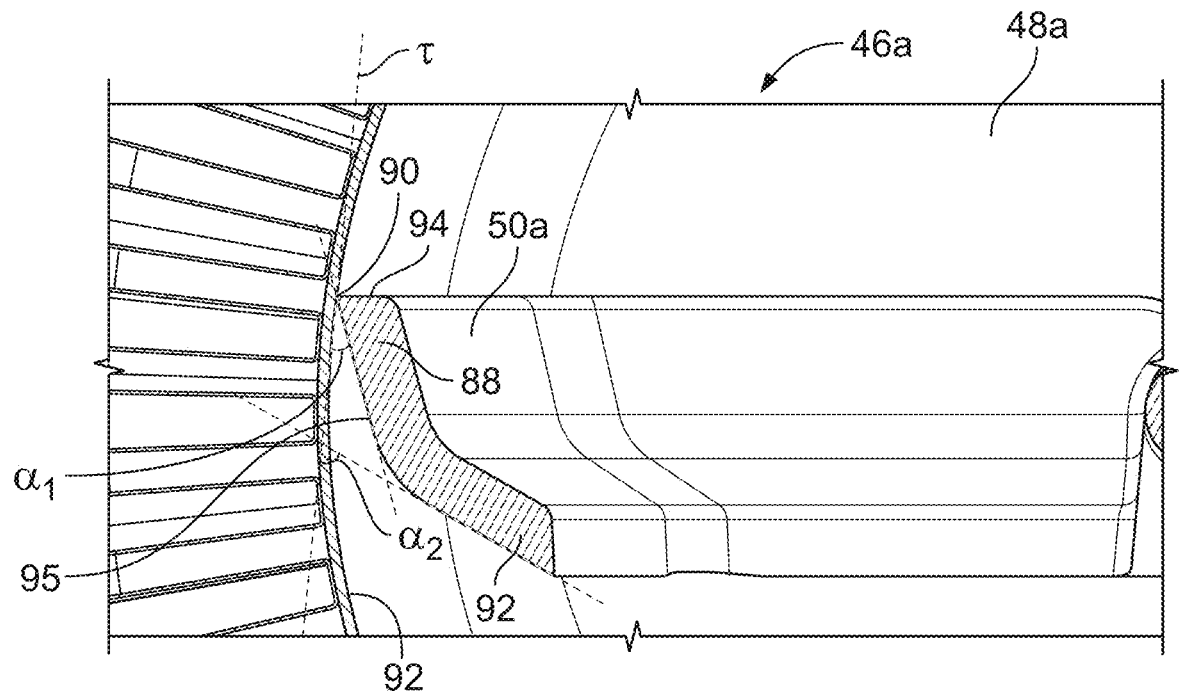

As shown in FIG. 12B, the second mixing arm 46b is generally a mirror image of the first mixing arm 46a such that, under rotation of the dasher 34 in direction R, different portions of the mixing arm 46b move over the inner surface 91, compared to the first mixing arm 46a. In particular, the edge 90 of the second mixing arm 46b is, effectively, a trailing edge 90 that trails the scraping portion 88 during rotation with an outer face 95 directing crystals along the inner surface 91 and compressing the food-product between outer face 95 and the inner surface 91 with a portion of the food-product moving inward past agitation rib 92. As the face 94 of the second mixing arm 46b does not provide any scraping effect, the face 94 can be positioned generally normal to the tangent $\tau$. The different movement and scraping and circulation actions provided, thusly, by the first and second mixing arms 46a and 46b can provide improved processing and texture of the resulting product, as discussed above. Each mixing arm 46a and 46b can include a grip flange 99 along the upper portions thereof to afford a portion of the dasher 34 that a user can easily grasp to remove the dasher 34 from the food-product receiving cavity 20 and any frozen or semi-frozen food product therein.

Figure 13:
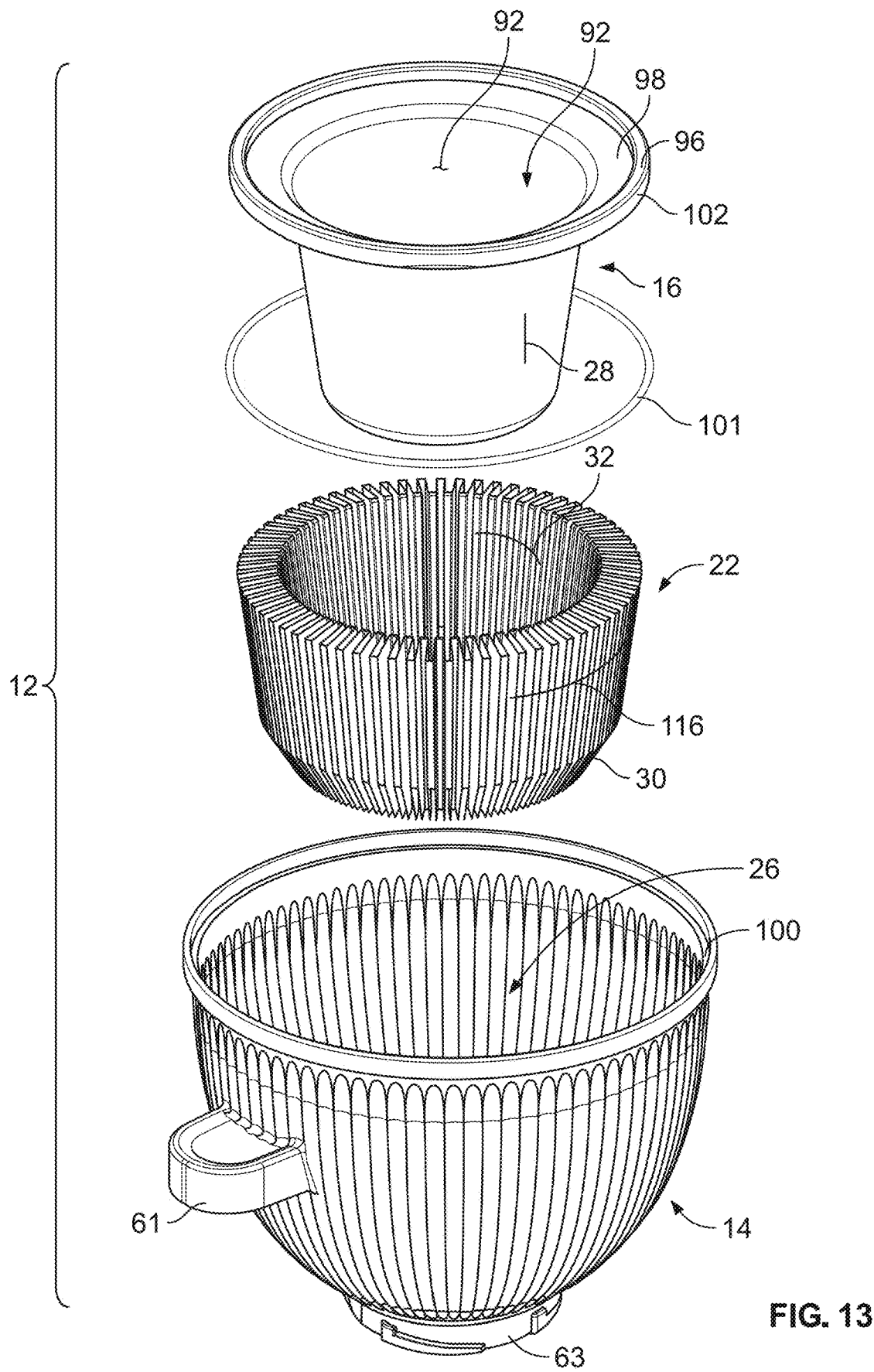
FIG. 13 is an exploded view of the mixing bowl.
Figure 14:
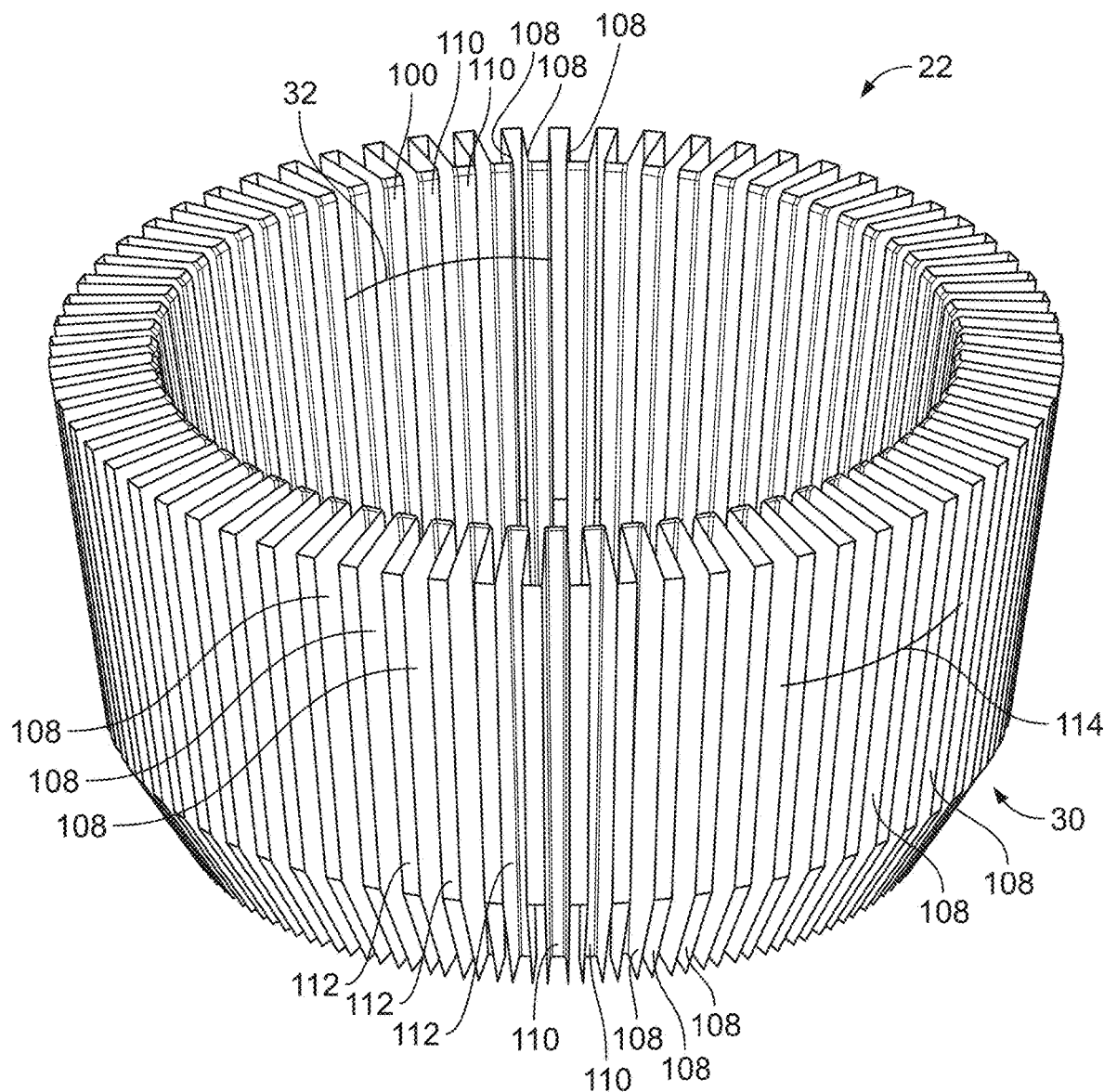
FIG. 14 is a perspective view of a radiator fin unit of the mixing bowl.

Turning to FIGS. 13-15, aspects of the mixing bowl 12 are discussed in greater detail. As shown in FIG. 13, and generally discussed above, the mixing bowl 12 includes the above-mentioned outer housing 14, along with the radiator fin unit 22 received in the outer housing 14. The inner liner 16 is also received within the outer housing 14 to enclose the radiator fin unit 22 within the wall cavity 18 defined between the outer housing 14 and the inner liner 16. The above-mentioned phase-change medium 24 is also received within the wall cavity 18 and surrounds the radiator fin unit 22 to varying degrees at least partially depending on the phase state of the medium 24. By way of example, the wall cavity 18 can contain about 44 oz. (by weight, +/−1 oz.) of the phase-change medium 24. In one aspect, the wall cavity 18 is tapered from a wider cross section (FIG. 8) toward the upper lip 96 of the mixing bowl 12 to a narrower cross section toward the lower portion of the mixing bowl 12. This tapered structure can provide an improved distribution of the phase-change material around the food-product receiving cavity 20, including a greater amount thereof around the open top portion of the mixing bowl 12 and a lesser amount around the enclosed inner portion. Further, such a taper can allow for retention of the phase-change medium 24 toward the upper portion of the food-product receiving cavity 20 during melting of the medium 24, which occurs over a time interval. As also mentioned above, the tapered arrangement can also provide easier access to the food-product receiving cavity 20 for the user, including during introduction of the liquid food-product or various additional ingredients thereto and the removal of the finished, frozen food-product therefrom. In various examples, the outer housing 14 can be of PC-ABS or ABS plastic at a thickness of about 3 mm and can include various decorative features to improve aesthetic appeal, while hiding material defects and providing strength to the outer housing 14. As discussed above, the handles 61 with integrated pin-receiving bosses 65 can be integrally formed in the outer housing 14.

In one aspect, the inner liner 16 extends outwardly along an upper surface 98 from the food-product receiving cavity 20 to mate with and extend over an upper rim 100 of the outer housing 14 at an outer ridge 102 thereof that defines the upper lip 96 of the mixing bowl 12 and can capture a sealing member 101 above the rim 100 of the outer housing 14 to enclose the wall cavity 18. The inner surface 91 of the food-product receiving cavity 20 defines an inner diameter 104 at an intersection with the upper surface 98 of the interior liner 16 of about 160 mm. The upper lip 96 defines a diameter 106 of about 206 mm. In other variations, the diameter 106 can be between about 125% and 130% greater than diameter 104, with such wider outer diameter 106 further providing the above-mentioned improved access to the food-product receiving cavity 20. Additionally, the area defined between the upper surface 98 and the ridge 102 can act as an overflow area to contain the food-product as its volume expands due to freezing and aeration. The inner liner 16 may be of a metallic or other conductive material, including Aluminum (and, more particularly, 5032-H32 Aluminum) at a thickness of, for example, 0.89 mm (+/−0.05 mm). The inner liner 16 may be sized and configured such that the food-product receiving cavity 20 has a capacity of at least about 2 qt. Additionally, the above-described overflow area can be structured to provide an additional capacity of at least about 0.5 qt.

As shown in FIGS. 14-16, the structure of the radiator fin unit 22 generally matches that of the wall cavity 18 to provide an increased surface area thereof in contact with a generally optimized volume of the phase-change medium 24. In this respect, the radiator fin unit 22 comprises a generally thin sheet of metal, such as Aluminum or the like (including 5052-H32 Aluminum) at a thickness of about 0.5 mm (+/−0.05 mm). The metal material is cut and bent into the depicted shape, wherein a plurality of fins 108 extend outwardly from a plurality of inner connectors 110 and outer connectors 112 that maintain the fins 108 in the unitary structure of the radiator fin unit 22. Such structure maintains the inner connectors 110 along a generally frustoconical profile 32 that matches the angled profile 28 of the inner liner 16. When assembled, the inner connectors 110 are in at least partial contact with the interior liner 16 to provide for direct conduction of heat from the inner liner 16 to the radiator fin unit 22. The fins 108 extend from the inner connectors 110 to further conduct heat away from the inner connectors 110 and inward within the phase-change medium 24 by conductive contact therewith. This arrangement allows for a more complete and rapid thawing of the phase-change medium 24 and corresponding rapid and thorough crystal formation within the food product. The fins 108 are spaced apart by the inner and outer connectors 110 and 112 at a distance 109 of about 6 mm (+/−0.25 mm) to receive an appreciable amount of the phase-change medium 24 therebetween (FIG. 15). As further shown in FIGS. 14 and 16, the outer profile 114 of the radiator fin unit 22 is partially defined by the outer connectors 112 and is angled to generally match the corresponding portion of the outer housing 14 to maximize the surface are of the fins 108 as they extend within the wall cavity 18. As discussed above, the fins 108 extend downward past the outer connectors 112 along a chamfered portion 30 of the radiator fin unit 22 that allows for further maximizing of the fin 108 surface area within the wall cavity 18.

As further shown in FIG. 13, the outer housing 14 of the mixing bowl 12 can have a plurality of vertically-oriented ribs 116 formed integrally therein so as to define a plurality of corresponding channels 118 therebetween. As shown, the ribs 116 and channels 118 can extend through a majority of the outer profile 26 of the outer housing 14 and, thusly, can provide structural support for the outer housing 14, including through the lower portion of the arced profile 26. This structural support can allow for a decreased material thickness for the outer housing 14, while providing resistance to potential adverse effects related to expansion and contraction of the phase-change medium 24 during freezing and thawing thereof, as well as of repeated assembly and disassembly with the mixer 56. The relative spacing between the ribs 116 can vary, as can the height between the outer extent of the ribs 116 and the innermost portions of the channels 118 to provide the desired strength of the housing 14, including for a desired material thickness. The cross-sectional profile and end portions of the ribs 116 and channels 118 are visible on the exterior of mixing bowl 12 and, accordingly, can also be adjusted to provide a desired aesthetic effect in addition to the above-described structural support.

Figure 17:
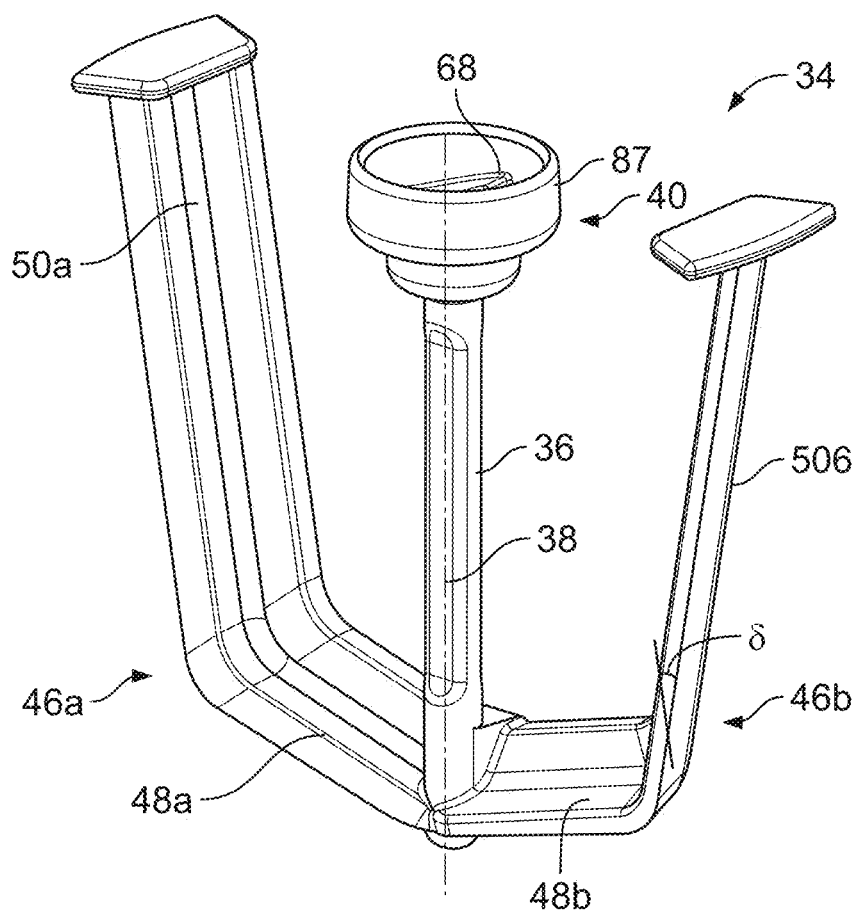
FIG. 17 is a perspective view of an alternative dasher useable with the assembly of FIG. 1.
Figure 18A:
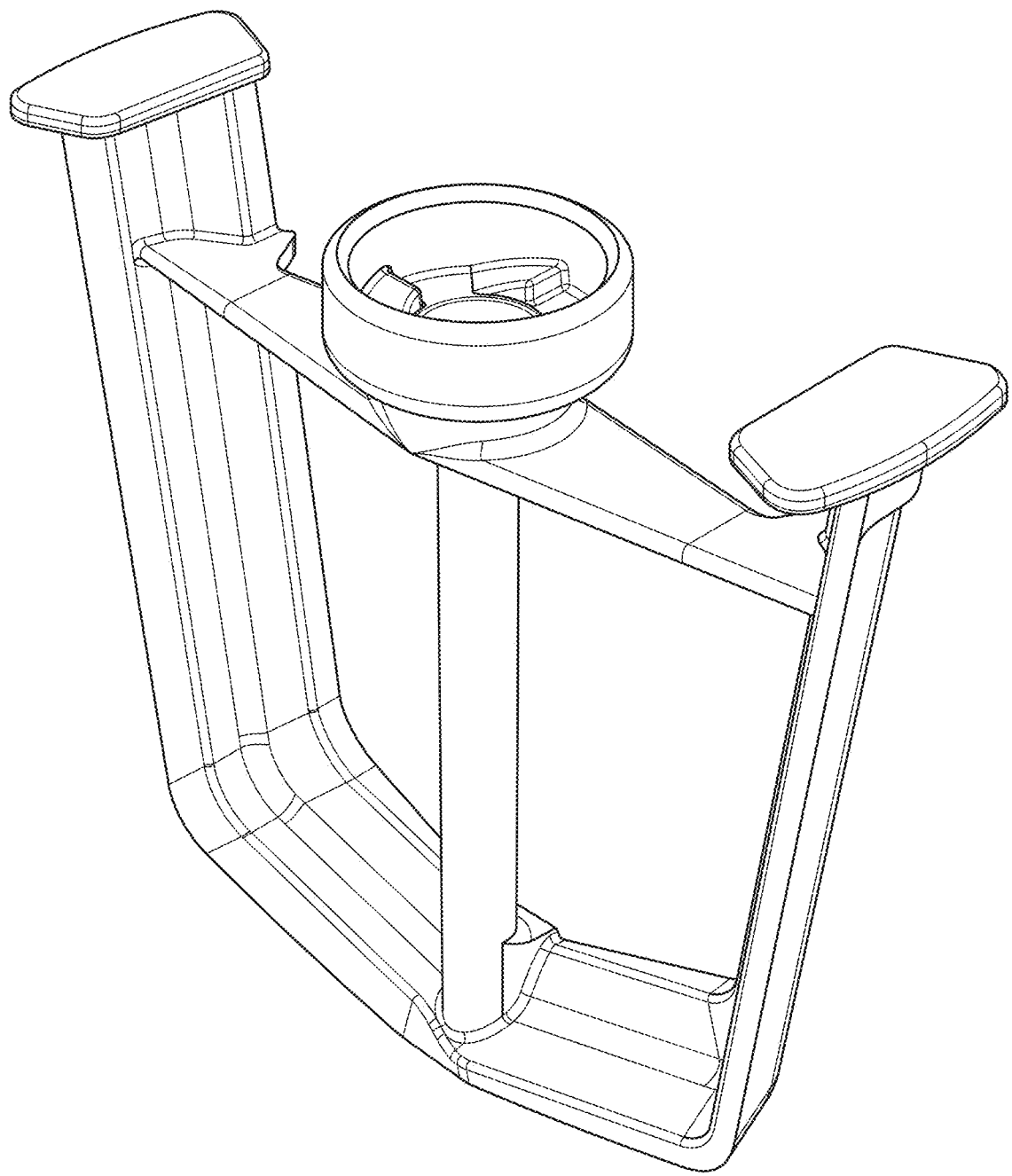
FIGS. 18A-18G are front-perspective, front, back, right, left, top, and bottom views showing the visual design of a dasher according to an aspect of the present disclosure, in which a later claim to such visual design can be made in whole or in part and contour lines can be replaced with shading.
Figure 18B:
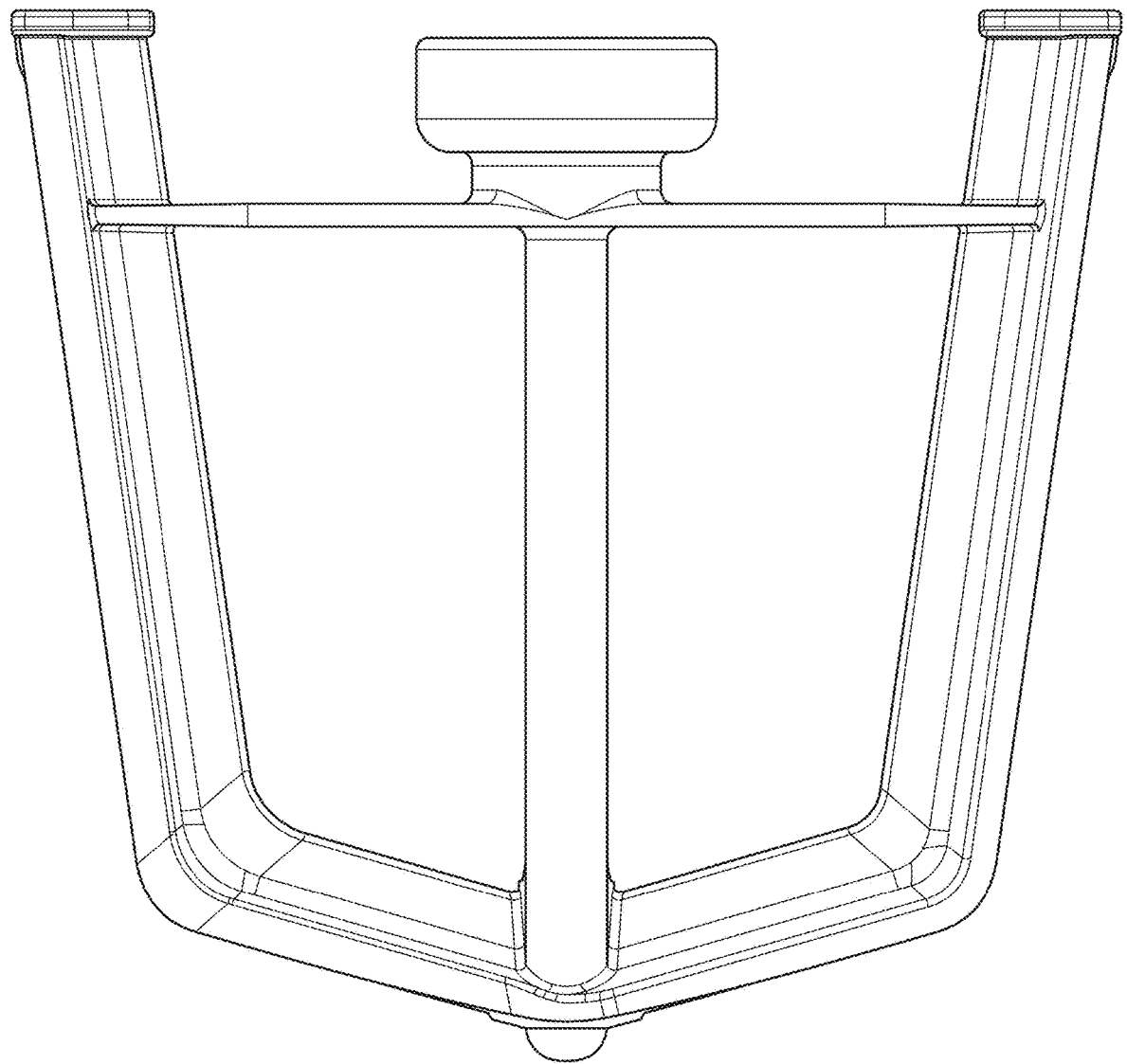
Figure 18C:
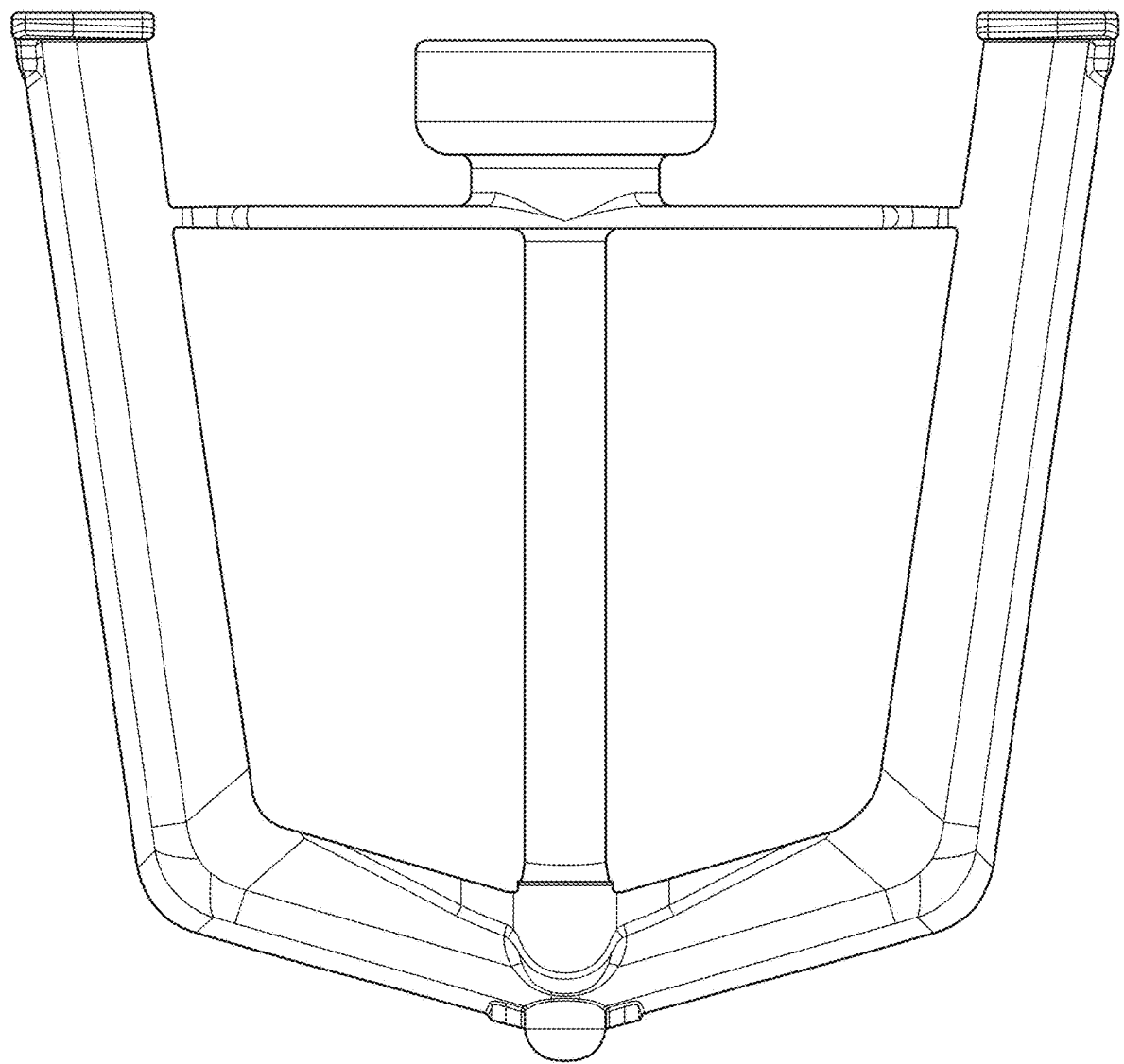
Figure 18D:
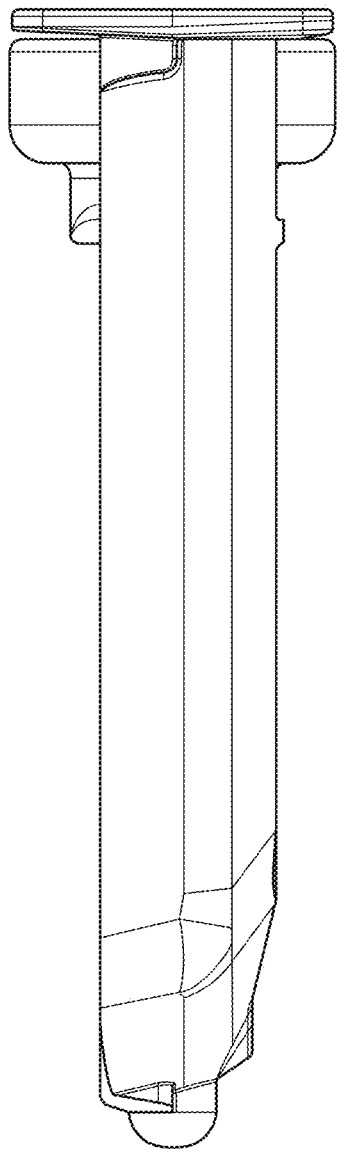
Figure 18E:
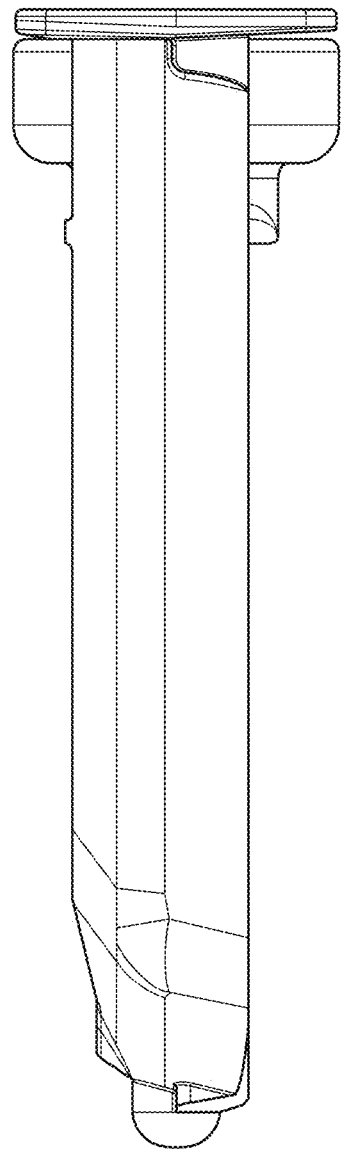
Figure 18F:
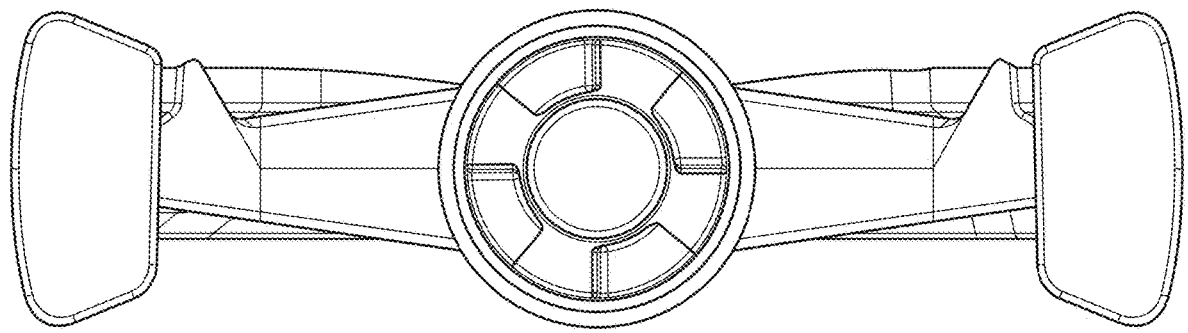
Figure 18G:
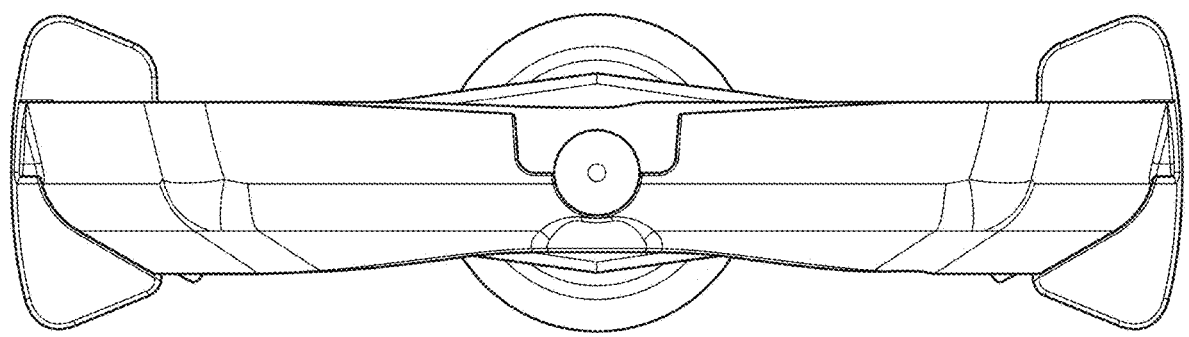

Turning to FIG. 17, in an variation of the above-described dasher 234 (wherein similar features are designated with like reference numerals increased by 200 such that features not specifically discussed herein are generally similar to those described above), the first and second mixing arms 246a, 246b can be cantilevered with respect to the center axle 236 at the anchor end 242. In other words, the mixing arms 246a and 246b, in the illustrated variation, are only attached with the center axle 236 at the anchor end 242 and are otherwise unsupported by structural ribs or other features extending between the center axle 236 and, for example the side portions 256a,256b of the mixing arms 246a,246b. This arrangement can allow for easier removal of the dasher 234 from a frozen food product created within the food-product receiving cavity 220 using the dasher 234. Even further, such an arrangement can allow for the removal of a substantial portion of the finished frozen food product from the mixing bowl 12 without removal of the dasher 234. Such shape can also allow for the mixing arms 246a,246b to fit against the inner liner 16 under compression, with the side portions 250a and 250b of the mixing arms 246a and 246b tapering outwardly from the support portions 248a and 248b at a draft angle δ of between about 6° and 8°. In this manner, the side portions 250a and 250b can compress inward with assembly of the dasher 234 against the inner liner 16 by between about 0.5° and 2°. This compression can cause the side portions 250a and 250b to contact the inner liner 16 under pressure, which can improve the scraping of ice crystals from the inner liner 16, including by scraping smaller crystals. Such compression may be balanced against the generation of noise by such scraping and to minimize heat generated by friction between components.

Further, in the illustrated example of the dasher 234, the first and second mixing arms 246a,246b each define, in a cross-sectional profile thereof, a scraping portion 288 having a leading edge 290 positionable in contact with the inner surface 91 of the food-product receiving cavity 220, in a similar manner to that which is discussed above with reference to FIGS. 12A and 12B. The scraping portion 288 extends at an acute angle with respect to a tangent of the leading edge 290 along the inner surface 91. The cross-sectional profile further has an agitation rib 292 extending from the scraping portion 288 away from the inner surface 91 at an obtuse angle with respect to the tangent. Notably, the first and second mixing arms 246a and 246b are mirror images of each other such that, under rotation of the dasher 234, different portions of the respective mixing arms move over the inner surface 91 causing scraping of the inner surface 91 in different ways and different agitation of the food product by the different mixing arms 246a and 246b. In one example, the mixing arm 246a is configured such that leading edge 290 is positioned forward of the scraping portion 288 with ice crystals contacting the leading edge 290 along with the front face 294 of the scraping portion 288. The front face 294 is positioned generally normal to the tangent such that crystals, along with the surrounding medium are directed inward from the inner surface 91, along the interior of the scraping portion 288 and further inward by the agitation rib 292. Conversely, the leading edge 290 of the second mixing arm 246b trails the scraping portion 288 during rotation with an outer face 295 directing crystals along the inner surface 91 and compressing the food product between the outer face 292 and the inner surface 91 with a portion of the food product moving inward past the agitation rib 292. The different movement and scraping and circulation actions provided, thusly, by the first and second mixing arms 246a and 246b can provide improved processing and texture of the resulting product, as discussed above. The present example, in which the mixing arms 246a and 246b are mirror images of one another, results in the dasher 234 that provides the same functionality regardless of the particular direction in which the hub 62 of the stand mixer 56 rotates.

Additional aspects of the present disclosure are described in the following paragraphs and all possible combinations thereof.

According to one such aspect of the present disclosure, an ice cream making assembly includes a mixing bowl, having an outer housing and an inner liner defining a wall cavity therebetween. The inner liner further defines a food-product receiving cavity therein. The mixing bowl further includes a radiator fin unit received within a portion of the wall cavity and a phase-change medium filling a further portion of the wall cavity surrounding at least a portion of the radiator fin unit. The outer housing defines an arc-shaped outer cross-sectional profile of the wall cavity, and the inner liner defines an angled inner cross-sectional profile of the wall cavity. The radiator fin unit defines an outer chamfer extending generally along the outer cross-sectional profile and a tapered inner profile extending along inner cross-sectional profile of the wall cavity and in at least partial contact with the inner liner. The assembly further includes a dasher having a center axle extending along an axis from an input end of the center axle to an anchor end contacting a central portion of the inner liner, the dasher further including first and second mixing arms including support portions extending outwardly from the anchor end of the axle and side portions extending upwardly and outwardly from the support portions to generally follow an angled inner profile of the food-product receiving cavity.

The input end of the center axle may define a first clutch plate and the assembly may further comprise a drive assembly including a second clutch plate operably engageable with the first clutch plate such that the drive assembly can cause rotation of the dasher within the food-product receiving cavity. The second clutch plate may further be biased against the first clutch plate and movable against the bias to selectively release from the first clutch plate.

The dasher may further define a circular flange surrounding the first clutch plate and extending upwardly therefrom opposite the anchor end of the center axle, and the second clutch plate may be operably receivable within the circular flange.

The drive assembly may further define an input plate with a channel configured to engage with a gear housing on an output of a mixing appliance.

The first and second mixing arms may be cantilevered with respect to the center axle at the anchor end.

The first and second mixing arms may each define, in a cross-sectional profile thereof, a scraping portion having a leading edge positionable in contact with an inner surface of the food-product receiving cavity with the scraping section extending at an acute angle with respect to a tangent of the leading edge along the inner surface. The cross-sectional profile may further have an agitation rib extending from the scraping portion away from the inner surface at an obtuse angle with respect to the tangent.

The outer bowl may include first and second handles extending from opposite sides thereof. The handles may each define a respective boss for receiving a retention pin of a bowl lift mechanism associated with a stand mixer.

The outer liner may defines an upper surface extending outwardly from a sidewall of the food-receiving cavity to an upper lip of the outer housing. The sidewall may define an inner diameter at an intersection of with the upper surface of about 160 mm. The upper lip may define an inner diameter of about 206 mm.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An ice cream making assembly, comprising:
a mixing bowl including:
an outer housing having an arc-shaped outer cross-sectional profile extending from an upper rim toward a base of the mixing bowl, the base being configured to couple with a base of the mixing appliance; and
an inner liner disposed within the outer housing to define a wall cavity therebetween, the inner liner defining a food-product receiving cavity having an upper edge spaced beneath and inset with respect to the upper rim and a sidewall extending downwardly and inwardly from the upper edge, the inner liner further defining an overflow area positioned above the food-product receiving cavity and extending outwardly from the upper edge toward the upper rim;
a dasher including a center axle extending along an axis from an input end of the center axle to an anchor end contacting a central portion of the inner liner within the food-product receiving cavity, the dasher further including first and second mixing arms having side portions spaced outwardly from the center axle to engage with the sidewall of the food-product receiving cavity, the input end of the center axle defining a first clutch plate; and
a drive assembly including a second clutch plate operably engageable with the first clutch plate such that the drive assembly can cause rotation of the dasher within the food-product receiving cavity, the second clutch plate being under a bias against the first clutch plate and movable against the bias to selectively release from the first clutch plate, the drive assembly further defines an input plate defining a channel configured to engage with a gear housing on an output of a mixing appliance.

2. The ice cream making assembly of claim 1, wherein the overflow area is defined by an upper surface of the inner liner that extends outwardly from the upper edge of the food-product receiving cavity to a base edge defined beneath the upper rim of the outer housing, the base edge defining an outer diameter of the upper surface that is greater than an inner diameter defined by the upper edge of the food-product receiving cavity.

3. The ice cream making assembly of claim 1, wherein the mixing bowl further includes a radiator fin unit received within the wall cavity, the radiator fin unit defining an outer profile extending along a first portion of the arc-shaped cross-sectional profile adjacent the upper rim, a chamfered portion extending along a second portion of the arc-shaped cross-sectional profile between the first portion and the base, and a tapered inner profile extending along the sidewall of the inner liner and in at least partial contact therewith.

4. The ice cream making assembly of claim 3, wherein:
the wall cavity tapers from a wider cross-section toward the upper edge toward a base of the mixing bowl; and
the mixing bowl further includes a phase-change medium filling a further portion of the wall cavity surrounding at least a portion of the radiator fin unit, the tapering of the wall cavity being such that the phase change medium is retained toward an upper portion of the food receiving cavity.

5. The ice cream making assembly of claim 1, wherein the dasher further defines a circular flange surrounding the first clutch plate and extending upwardly therefrom opposite the anchor end of the center axle, the second clutch plate being operably receivable within the circular flange.

6. The ice cream making assembly of claim 1, wherein an outer bowl includes first and second handles extending from opposite sides thereof, the handles each defining a respective boss for receiving a retention pin of a bowl lift mechanism associated with a stand mixer.

7. The ice cream making assembly of claim 1, wherein the inner liner defines an upper surface extending outwardly from a sidewall of the food-product receiving cavity to an upper lip of the outer housing, the sidewall defining an inner diameter at an intersection of with the upper surface of about 160 mm, the upper lip defining an outer diameter of about 206 mm.

8. An ice cream making attachment for a stand mixer, comprising:
a mixing bowl including an inner liner defining a food-product receiving cavity having a sidewall;
a dasher including a center axle extending along an axis from an input end of the center axle to an anchor end contacting a central portion of the inner liner, the dasher further including first and second mixing arms spaced from the center axle and positionable within the food-product receiving cavity in contact with respective portions of the sidewall, the input end of the center axle defining a first clutch plate; and
a drive assembly including a second clutch plate operably engageable with the first clutch plate such that the drive assembly can cause rotation of the dasher within the food-product receiving cavity to move the mixing arms along the sidewall, the second clutch plate being biased against the first clutch plate and movable against the bias to selectively release from the first clutch plate, the drive assembly further defining an input plate defining a channel configured to engage with a gear housing on an output of the stand mixer.

9. The ice cream making attachment of claim 8, wherein the dasher further defines a circular flange surrounding the first clutch plate and extending upwardly therefrom opposite the anchor end of the center axle, the second clutch plate being operably receivable within the circular flange.

10. The ice cream making attachment of claim 8, wherein the channel of the input plate includes a plurality of compressible inserts spaced along a length of the channel on opposite sides thereof.

11. The ice cream making attachment of claim 8, wherein the channel is tapered to selectively engage with one of a plurality of gear housings, including the gear housing, the plurality of gear housings having varying configurations.

12. The ice cream making attachment of claim 8, wherein the first and second mixing arms each define, in a cross-sectional profile thereof, a scraping portion having a leading edge positionable in contact with an inner surface of the food-product receiving cavity with the scraping portion extending at an acute angle with respect to a tangent of the leading edge along the inner surface, the cross-sectional profile further having an agitation rib extending from the scraping portion away from the inner surface at an obtuse angle with respect to the tangent.

13. A mixing bowl for an ice cream maker, comprising:
an outer housing having an arc-shaped cross-sectional profile, including a first portion extending from an upper rim and a second portion disposed toward a base of the mixing bowl;
an inner liner disposed within the outer housing to define a wall cavity between the outer housing and the inner liner, the inner liner defining a food-product receiving cavity, the wall cavity tapering from a wider cross-section within the second portion of the arc-shaped cross-sectional profile;
a radiator fin unit received within the wall cavity, the radiator fin unit defining an outer profile extending along the first portion of the arc-shaped outer cross-sectional profile adjacent the upper rim and a chamfered portion extending within the second portion of the arc-shaped cross-sectional profile, the chamfered portion defining a tapered shape of the radiator fin unit that fits within the tapering of the wall cavity within the second portion of the cross-sectional profile; and
a phase-change medium comprising a 32.5% urea solution filling a further portion of the wall cavity surrounding at least a portion of the radiator fin unit, the tapering of the wall cavity being such that the phase change medium is retained toward an upper portion of the food receiving cavity.

14. The mixing bowl for an ice cream maker of claim 13, wherein the outer housing has at least one integral support feature extending along at least a portion of the arc-shaped outer cross-sectional profile, the at least one integral support feature being visible along an outer surface of the outer housing.

15. The mixing bowl for an ice cream maker of claim 14, wherein the at least one integral support feature comprises a plurality of vertically-oriented ribs extending along at least a portion of the outer housing.

16. The mixing bowl for an ice cream maker of claim 15, wherein one of the plurality of vertically-oriented ribs are defined on opposite sides of one of a plurality of channels extending along respective portions of the outer housing.

17. The mixing bowl for an ice cream maker of claim 13, wherein the phase-change medium comprises about 44 oz. of the 32.5% urea solution.

18. The mixing bowl for an ice cream maker of claim 13, wherein the radiator fin unit includes:
- a plurality of fins extending radially outward between the inner liner and the outer housing;
- a plurality of inner connectors positioned adjacent the inner liner joined between adjacent ones of the plurality of fins and extending along a height of the radiator fin unit; and
- a plurality of outer connectors positioned adjacent the outer housing and joined between adjacent ones of the ribs, the chamfered portion of the radiator fin unit extending below the outer connectors.

* * * * *